(12) United States Patent
Lee et al.

(10) Patent No.: US 11,764,671 B2
(45) Date of Patent: Sep. 19, 2023

(54) VOLTAGE CONVERTER

(71) Applicant: Samsung Electronics Co., Ltd., Suwon-si (KR)

(72) Inventors: Kwang Chan Lee, Hwaseong-si (KR); Hyoungseok Oh, Seoul (KR); Hojun Yu, Seoul (KR); Jeongkwang Lee, Hwaseong-si (KR); Jungwook Heo, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 4 days.

(21) Appl. No.: 17/536,810

(22) Filed: Nov. 29, 2021

(65) Prior Publication Data
US 2022/0085716 A1    Mar. 17, 2022

Related U.S. Application Data

(63) Continuation of application No. 16/850,413, filed on Apr. 16, 2020, now Pat. No. 11,190,097.

(30) Foreign Application Priority Data

Sep. 9, 2019    (KR) .......................... 10-2019-0111440

(51) Int. Cl.
*H02M 3/07* (2006.01)
*H02M 3/158* (2006.01)
*H02M 1/00* (2006.01)

(52) U.S. Cl.
CPC ........... *H02M 3/07* (2013.01); *H02M 1/0095* (2021.05); *H02M 1/009* (2021.05); *H02M 3/158* (2013.01); *H02M 3/1582* (2013.01)

(58) Field of Classification Search
CPC ............. H02M 1/009; H02M 1/0095; H02M 3/07–078; H02M 3/155–1588
See application file for complete search history.

(56) References Cited

U.S. PATENT DOCUMENTS

| | | |
|---|---|---|
| 6,429,632 B1 | 8/2002 | Forbes et al. |
| 7,696,735 B2 | 4/2010 | Oraw et al. |
| 8,259,476 B2 | 9/2012 | Ben-Yaakov et al. |
| 8,427,113 B2 | 4/2013 | Xing et al. |
| 8,860,396 B2 | 10/2014 | Giuliano |
| 9,385,591 B2 | 7/2016 | Philip |
| 9,866,110 B2 | 1/2018 | Ruiz et al. |

(Continued)

*Primary Examiner* — Fred E Finch, III
(74) *Attorney, Agent, or Firm* — Harness, Dickey & Pierce, P.L.C.

(57) ABSTRACT

A voltage converter including first to fourth switches between a first voltage node and ground, fifth to eighth switches between the first voltage node and the ground, a first floating capacitor between a first node between the first and second switches and a second node between the third and fourth switches, a second floating capacitor between a third node between the fifth and sixth switches and a fourth node between the seventh and eighth switches, a ninth switch between a second voltage node and a center node, a first inductor between the second node and a third voltage node, a center capacitor between the center node and the ground, a tenth switch between the second voltage node and the third voltage node, a first capacitor between the third voltage node and the ground, and a second capacitor between the second voltage node and the ground may be provided.

19 Claims, 23 Drawing Sheets

(56) References Cited

U.S. PATENT DOCUMENTS

| | | | |
|---|---|---|---|
| 9,954,436 B2 | 4/2018 | Khlat | |
| 10,256,729 B1* | 4/2019 | Notsch | H02M 3/1588 |
| 10,547,241 B1 | 1/2020 | Li et al. | |
| 11,190,097 B2* | 11/2021 | Lee | H02M 1/0095 |
| 2007/0296383 A1 | 12/2007 | Xu et al. | |
| 2009/0039947 A1* | 2/2009 | Williams | H02M 3/07 |
| | | | 327/536 |
| 2011/0101938 A1 | 5/2011 | Ma et al. | |
| 2014/0184189 A1 | 7/2014 | Salem | |
| 2014/0266135 A1* | 9/2014 | Zhak | H02M 3/07 |
| | | | 323/311 |
| 2015/0015088 A1* | 1/2015 | Petersen | H02M 1/15 |
| | | | 307/110 |
| 2017/0331374 A1 | 11/2017 | Hoyerby | |
| 2018/0175726 A1 | 6/2018 | Petersen et al. | |
| 2019/0348913 A1 | 11/2019 | Zhang et al. | |
| 2020/0067409 A1* | 2/2020 | Li | H02M 1/08 |
| 2020/0212704 A1 | 7/2020 | Eftimie | |
| 2020/0212807 A1* | 7/2020 | Das | H02M 3/33576 |
| 2020/0336063 A1 | 10/2020 | Petersen | |
| 2020/0395852 A1 | 12/2020 | Yoo et al. | |
| 2021/0036604 A1 | 2/2021 | Khlat et al. | |
| 2021/0067033 A1 | 3/2021 | Jing et al. | |
| 2021/0119540 A1* | 4/2021 | Kawano | H02M 3/158 |

\* cited by examiner

VOLTAGE CONVERTER

CROSS-REFERENCE TO RELATED APPLICATIONS

This application is a continuation of U.S. application Ser. No. 16/850,413, filed on Apr. 16, 2020, which claims priority under 35 U.S.C. § 119 to Korean Patent Application No. 10-2019-0111440 filed on Sep. 9, 2019, in the Korean Intellectual Property Office, the disclosure of each of which is incorporated by reference herein in its entirety.

BACKGROUND

Some example embodiments of the inventive concepts described herein relate to semiconductor devices, and more particularly, relate to voltage converters configured to perform various buck conversions and boost conversions.

Electronic devices generate and use voltages of various levels therein. In particular, mobile devices, which use a battery, such as a smartphone and a smart pad may generate voltages of various levels due to the battery.

When a mobile device is connected to a charger, the mobile device may separately generate a voltage for charging a battery and a voltage to be supplied to internal components based on an external power. Also, in the case where the mobile device is connected to a device, which is supplied with a power from the mobile device, such as an on the go (OTG) device, the mobile device may generate a voltage to be supplied to the external mobile device based on a voltage of a battery.

Because the mobile device generates various voltages, the mobile device may include a plurality of voltage converters. This causes an increase in costs for manufacturing the mobile device and an increase in the size of the mobile device.

SUMMARY

Some example embodiments of the inventive concepts provide voltage converters configured to perform various buck conversions and boost conversions.

According to an example embodiment, a voltage converter includes first to fourth switches that are sequentially connected between a first voltage node and a ground node, fifth to eighth switches that are sequentially connected between the first voltage node and the ground node and are in parallel with the first to fourth switches, a first floating capacitor that is connected between a first node between the first and second switches and a second node between the third and fourth switches, a second floating capacitor that is connected between a third node between the fifth and sixth switches and a fourth node between the seventh and eighth switches, a ninth switch that is connected between a second voltage node, the center node being a node to which a node between the second and third switches and a node between the sixth and seventh switches are connected in common, a first inductor that is connected between the second node and a third voltage node, a center capacitor that is connected between the center node and the ground node, a tenth switch that is connected between the second voltage node and the third voltage node, a first capacitor that is connected between the third voltage node and the ground node, and a second capacitor that is connected between the second voltage node and the ground node.

According to an example embodiment, a voltage converter includes first to fourth switches that are sequentially connected between a first voltage node and a ground node, fifth to eighth switches that are sequentially connected between the first voltage node and the ground node and are in parallel with the first to fourth switches, a first floating capacitor that is connected between a first node between the first and second switches and a second node between the third and fourth switches, a second floating capacitor that is connected between a third node between the fifth and sixth switches and a fourth node between the seventh and eighth switches, a ninth switch that is connected between a second voltage node and a center node, the center node being a node to which a node between the second and third switches and a node between the sixth and seventh switches are connected in common, a first inductor that is connected between the first node and a third voltage node, a center capacitor that is connected between the center node and the ground node, a tenth switch that is connected between the second voltage node and the third voltage node, a first capacitor that is connected between the third voltage node and the ground node, and a second capacitor that is connected between the second voltage node and the ground node.

According to an example embodiment, a voltage converter includes a switched capacitor block connected between a first voltage node and a ground node, the switched capacitor block including a plurality of first switches and a plurality of capacitors, a path control block connected to a second voltage node, a third voltage node, and the switched capacitor block, the path control block including a plurality of second switches, and a passive element block that is connected to the second voltage node, the third voltage node, and the switched capacitor block, the passive element block including one or more capacitors and one or more inductors. In a first type operation, the voltage converter receives a first voltage at the first voltage node, converts the first voltage, and transfers the converted first voltage to at least one of the second voltage node or the third voltage node. In a second type operation, the voltage converter receives a second voltage at the first voltage node and transfers the second voltage to the second voltage node. In a third type operation, the voltage converter receives a third voltage at the second voltage node, converts the third voltage, and transfers the converted third voltage to the first voltage node.

BRIEF DESCRIPTION OF THE DRAWINGS

The above and other objects and features of the inventive concepts will become apparent by describing in detail example embodiments thereof with reference to the accompanying drawings.

DETAILED DESCRIPTION

Below, example embodiments of the inventive concepts may be described in detail and clearly to such an extent that a person of ordinary skill in the art can easily implements the inventive concepts.

While the term "same," "equal," or "identical" is used in description of example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As used herein, the term "and/or" includes any and all combinations of one or more of the associated listed items. Expressions such as "at least one of," when preceding a list of elements, modify the entire list of elements and do not modify the individual elements of the list. Thus, for example, both "at least one of A, B, or C" and "A, B, and/or C" means either A, B, C or any combination thereof. (Expressions such as "at least one of," when preceding a list of elements, modify the entire list of elements and do not modify the individual elements of the list.)

Figure 1:
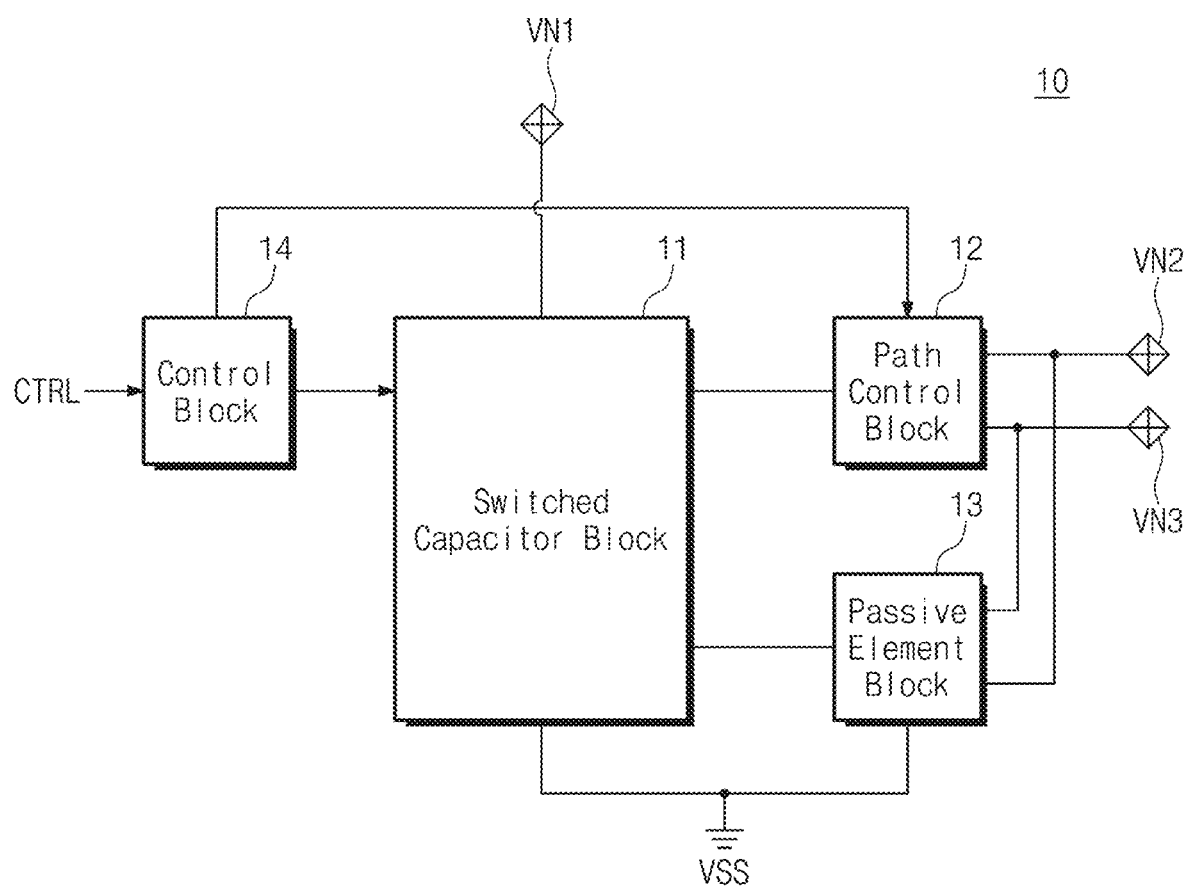
FIG. 1 illustrates a voltage converter according to an example embodiment of the inventive concepts.

FIG. 1 illustrates a voltage converter 10 according to an example embodiment of the inventive concepts. Referring to FIG. 1, the voltage converter 10 includes a switched capacitor block 11, a path control block 12, a passive element block 13, a control block 14, a first voltage node VN1, a second voltage node VN2, and a third voltage node VN3.

The switched capacitor block 11 may be connected to the first voltage node VN1, a ground node to which a ground voltage VSS is supplied, the path control block 12, and the passive element block 13. The path control block 12 may be connected to the second voltage node VN2, the third voltage node VN3, the switched capacitor block 11, and the passive element block 13. The passive element block 13 may be connected to the second voltage node VN2, the third voltage node VN3, the ground node, the switched capacitor block 11, and the path control block 12.

The switched capacitor block 11 may include switches connected between the first voltage node VN1 and the ground node and capacitors connected in parallel with the switches. The path control block 12 may change a connection relationship between the second voltage node VN2, the third voltage node VN3, and the switched capacitor block 11. The passive element block 13 may include passive elements such as capacitors and inductors.

The control block 14 may receive a control signal CTRL from an external device. The control block 14 may adjust a mode and an operating type of the voltage converter 10 in response to the control signal CTRL.

The voltage converter 10 may perform various buck conversions and boost conversions depending on a mode and an operating type. For example, when a voltage is input to the first voltage node VN1, the voltage converter 10 may operate in a first mode. In the first mode, depending on the operating type, the voltage converter 10 may step down (e.g., decrease) a voltage of the first voltage node VN1 and may transfer the converted voltage to at least one of the second voltage node VN2 or the third voltage node VN3. In this case, the voltage converter 10 may operate as a buck converter (e.g., a step-down converter).

In the first mode, depending on the operating type, the voltage converter 10 may transfer a voltage of the first voltage node VN1 to the second voltage node VN2 (or the third voltage node VN3) without converting the voltage of the first voltage node VN1.

When a voltage is input to the second voltage node VN2, the voltage converter 10 may be in a second mode. In the second mode, depending on the operating type, the voltage converter 10 may step up (e.g., increase) a voltage of the second voltage node VN2 and may transfer the converted voltage to the first voltage node VN1. In this case, the voltage converter 10 may operate as a boost converter (e.g., a step-up converter).

A buck conversion manner in which the voltage converter 10 decreases a voltage and a boost conversion manner in which the voltage converter 10 increases a voltage may be selected depending on the operating type. As such, the voltage converter 10 may be configured to operate as various buck converters and boost converters. Accordingly, the voltage converter 10 may replace various buck converters and boost converters.

Figure 2:
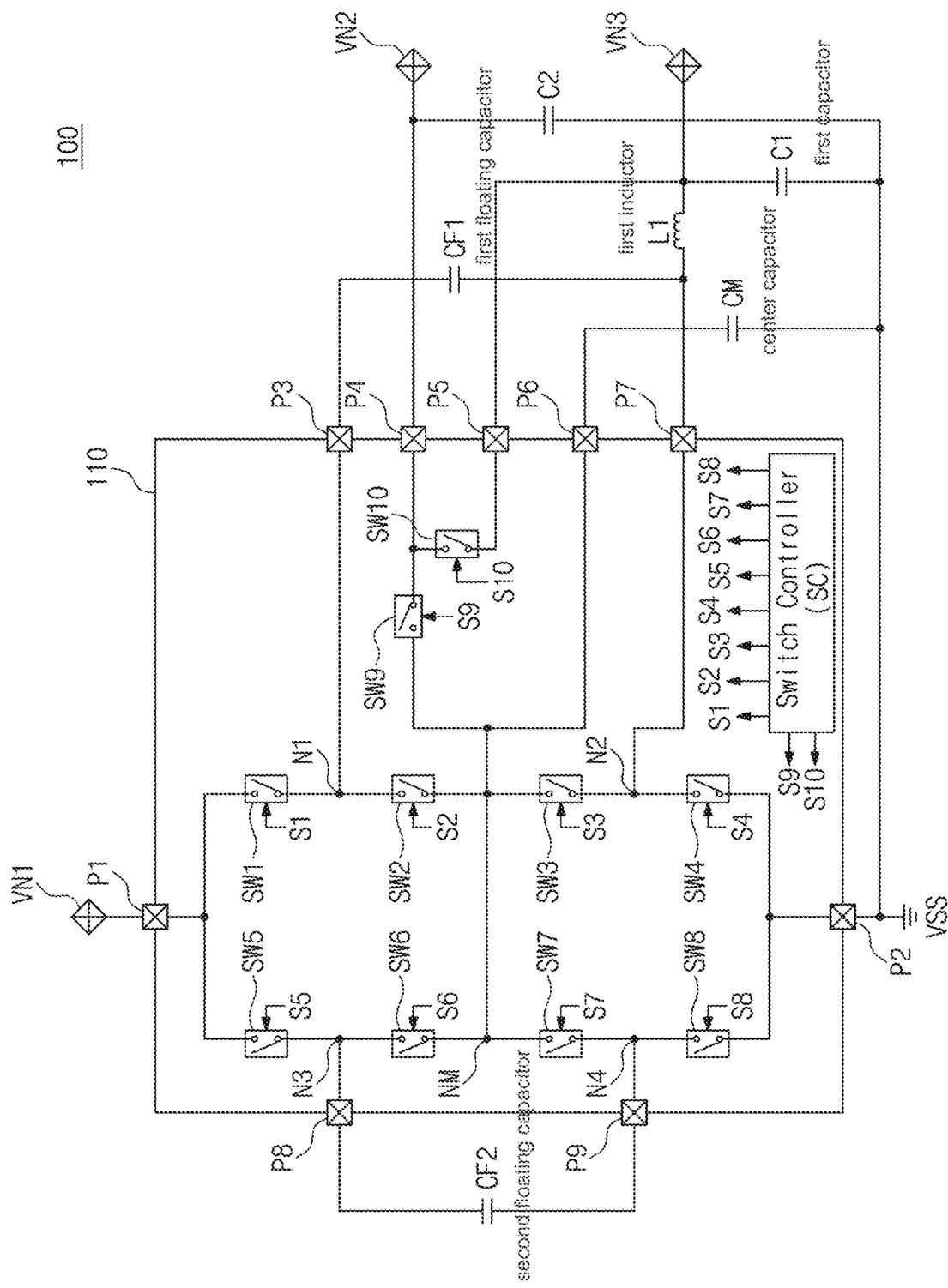
FIG. 2 illustrates a voltage converter implemented according to a first example embodiment.

FIG. 2 illustrates a voltage converter 100 implemented according to a first example embodiment. Referring to FIG. 2, the voltage converter 100 may include an integrated circuit 110. The integrated circuit 110 may be connected with the outside through first to ninth pads P1 to P9. The integrated circuit 110 may include first to fourth switches SW1 to SW4 that are sequentially connected in series between the first pad P1 and the second pad P2.

The integrated circuit 110 may further include fifth to eighth switches SW5 to SW8 that are connected in parallel with the first to fourth switches SW1 to SW4, which are disposed between the first pad P1 and the second pad P2, and are sequentially connected in series between the first pad P1 and the second pad P2.

A node between the second and third switches SW2 and SW3 and a node between the sixth and seventh switches SW6 and SW7 may be connected to form a center node NM. The center node NM may be connected to the sixth pad P6. A first node N1 between the first and second switches SW1 and SW2 may be connected to the third pad P3. A second node N2 between the third and fourth switches SW3 and SW4 may be connected to the seventh pad P7.

A third node N3 between the fifth and sixth switches SW5 and SW6 may be connected to the eighth pad P8. A fourth node N4 between the seventh and eighth switches SW7 and SW8 may be connected to the ninth pad P9.

The integrated circuit 110 may further include a ninth switch SW9 connected between the center node NM and the fourth pad P4 and a tenth switch SW10 connected between the fourth pad P4 and the fifth pad P5. The integrated circuit 110 may further include a switch controller SC that generates first to tenth signals S1 to S10 for controlling the first to tenth switches SW1 to SW10. The switch controller SC may include processing circuitry such as hardware including logic circuits or a hardware/software combination such as a processor executing software. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The voltage converter 100 may further include the first voltage node VN1 connected with the first pad P1, the second voltage node VN2 connected with the fourth pad P4, and the third voltage node VN3 connected with the seventh pad P7 through a first inductor L1. Each of the first to third voltage nodes VN1 to VN3 may be used to receive a voltage from the outside or to output a voltage to the outside. The second pad P2 of the integrated circuit 110 may be connected with the ground node.

The voltage converter 100 may further include a first floating capacitor CF1 connected between the third pad P3 and the seventh pad P7, a center capacitor CM connected between the ground node supplied with a ground voltage VSS and the sixth pad P6, the first inductor L1 connected between the seventh pad P7 and the third voltage node VN3, a first capacitor C1 connected between the fifth pad P5 and the ground node, a second capacitor C2 connected between the fourth pad P4 and the ground node, and a second floating capacitor CF2 connected between the eighth pad P8 and the ninth pad P9.

In an example embodiment, the first to eighth switches SW1 to SW8, the first and second floating capacitors CF1 and CF2, and the center capacitor CM may constitute the switched capacitor block 11 of FIG. 1. The ninth and tenth switches SW9 and SW10 may constitute the path control block 12 of FIG. 1.

The first capacitor C1, the second capacitor C2, and the first inductor L1 may constitute the passive element block 13 of FIG. 1. The switch controller SC may constitute the control block 14 of FIG. 1. A path through which the control signal CTRL is transferred to the switch controller SC is not shown for the sake of simplicity.

In the above description given with reference to FIG. 2, components included in the integrated circuit 110, the switched capacitor block 11, the path control block 12, the passive element block 13, and the control block 14 are disclosed in detail. However, components included in each of the integrated circuit 110, the switched capacitor block 11, the path control block 12, the passive element block 13, and the control block 14 may be changed or modified.

For example, a component mentioned as being included in one of the integrated circuit 110, the switched capacitor block 11, the path control block 12, the passive element block 13, or the control block 14 may be included in another component as a portion thereof.

Further, at least one of components included in each of the integrated circuit 110, the switched capacitor block 11, the path control block 12, the passive element block 13, or the control block 14 may be removed. At least one additional component may be added to at least one of the integrated circuit 110, the switched capacitor block 11, the path control block 12, the passive element block 13, or the control block 14.

Figure 3:
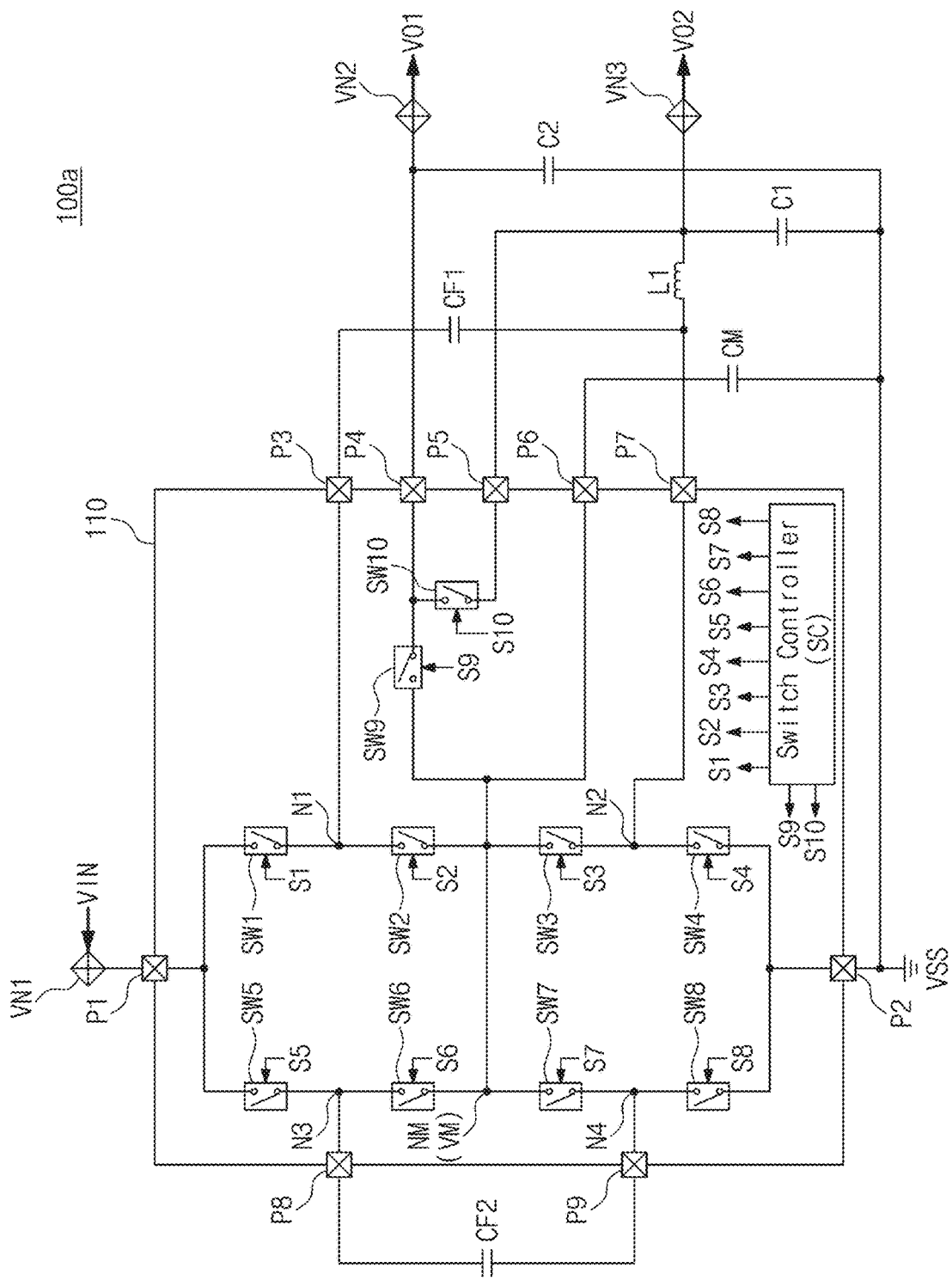
FIG. 3 illustrates a voltage converter set to a first mode.

FIG. 3 illustrates a voltage converter 100a set to a first mode. Referring to FIG. 3, in the first mode, the voltage converter 100a may receive an input voltage VIN at the first voltage node VN1. The voltage converter 100a may use at least one of the second voltage node VN2 or the third voltage node VN3 as an output.

For example, the voltage converter 100a may output a first output voltage VO1 at the second voltage node VN2, and may output a second output voltage VO2 at the third voltage node VN3.

Figure 4:
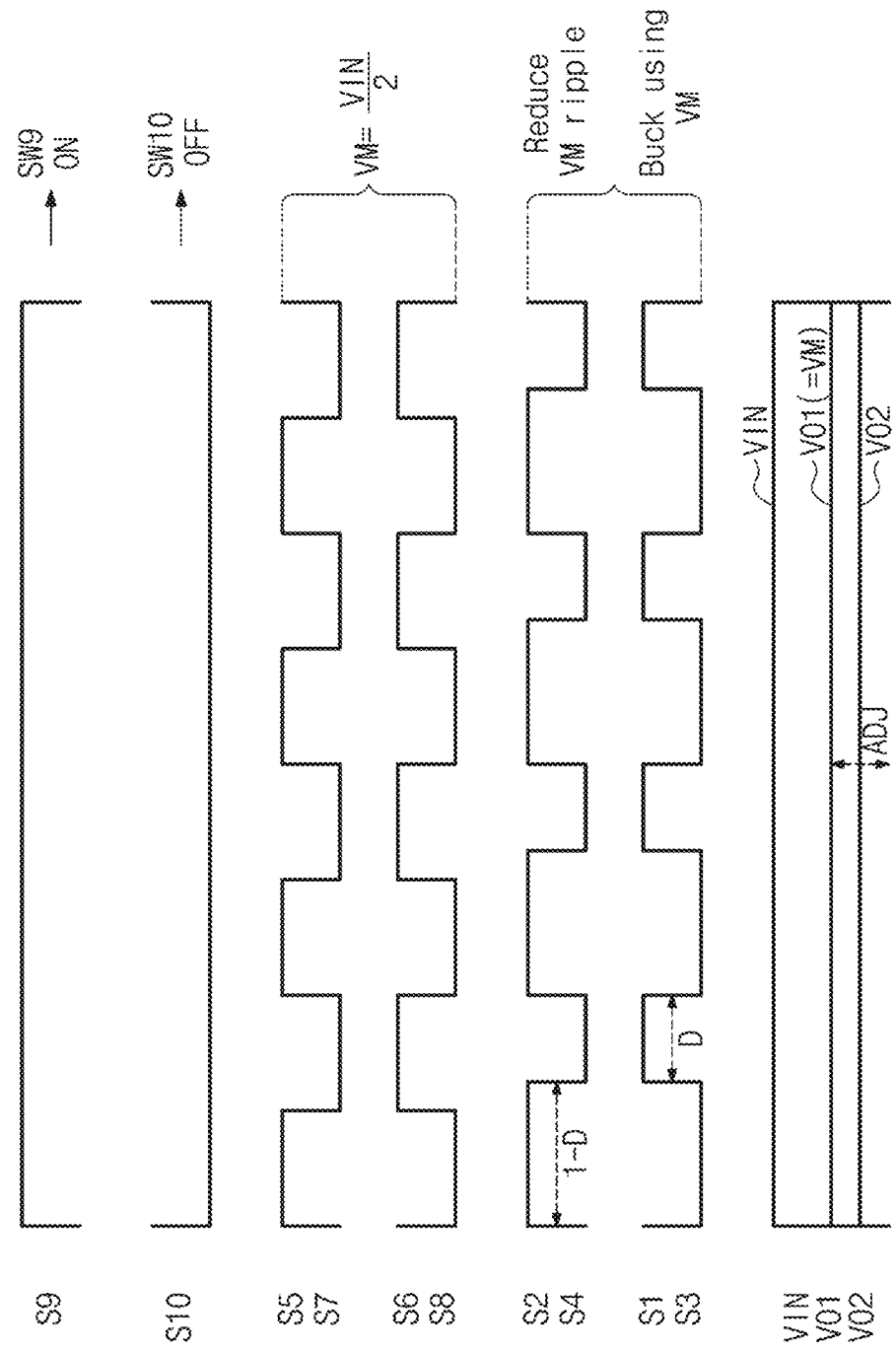
FIG. 4 illustrates an example illustrating how to control switches depending on a first type operation of a first mode.
Figure 5:
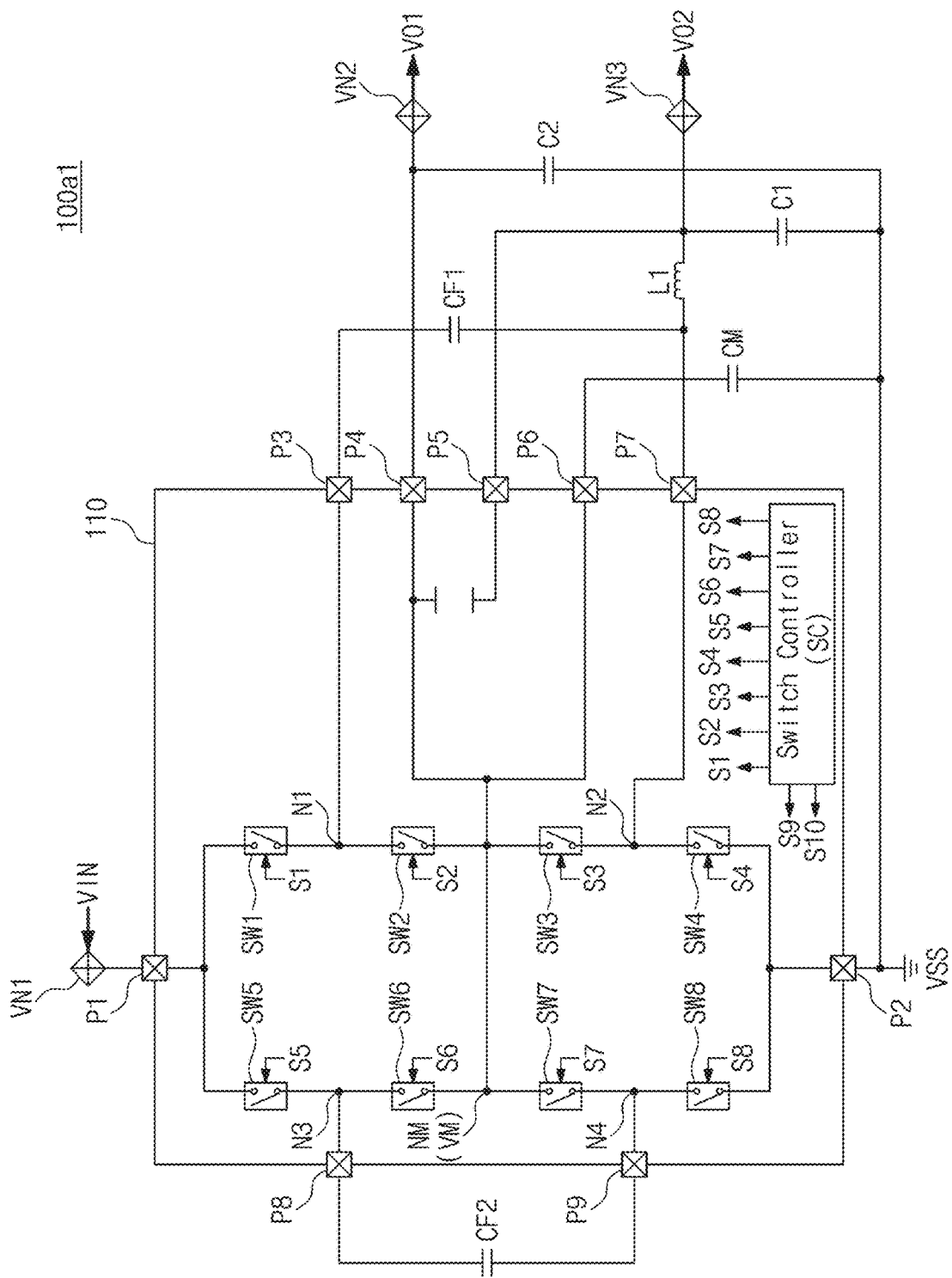
FIG. 5 illustrates a voltage converter modeled depending on a first type operation of a first mode.

FIG. 4 illustrates an example illustrating how to control switches depending on a first type operation in a first mode. FIG. 5 illustrates a voltage converter 100a1 modeled depending on a first type operation in a first mode. Referring to FIGS. 3, 4, and 5, the ninth signal S9 maintains a high level, and the ninth switch SW9 is turned on. Accordingly, the ninth switch SW9 is depicted as being short-circuited.

The tenth signal S10 maintains a low level, and the tenth switch SW10 is turned off. Accordingly, the tenth switch SW10 is depicted as being open. The fifth and seventh signals S5 and S7 toggle between the low level and the high level in synchronization with each other. Accordingly, the fifth and seventh switches SW5 and SW7 toggle (or switch) between turn-on and turn-off in synchronization with each other. For example, a duty ratio of the fifth and seventh signals S5 and S7 may be 50%.

The sixth and eighth signals S6 and S8 toggle between the low level and the high level in synchronization with each other. The sixth and eighth signals S6 and S8 may toggle to be complementary to the fifth and seventh signals S5 and S7. Accordingly, the sixth and eighth switches SW6 and SW8 may toggle to be complementary to the fifth and seventh switches SW5 and SW7.

In response to the fifth to eighth signals S5 to S8, the fifth to eighth switches SW5 to SW8 operate as a switched capacitor voltage divider. The fifth to eighth switches SW5 to SW8 may adjust a level of a center voltage VM of the center node NM to half the level of the input voltage VIN.

The first and third signals S1 and S3 toggle between the low level and the high level in synchronization with each other. Accordingly, the first to third switches SW1 and SW3 may toggle in synchronization with each other. The second and fourth signals S2 and S4 may toggle in synchronization with each other. The second and fourth signals S2 and S4 may toggle to be complementary to the first and third signals S1 and S3. Accordingly, the second and fourth switches SW2 and SW4 may toggle in synchronization with each other and may toggle to be complementary to the first and third switches SW1 and SW3.

The third switch SW3, the fourth switch SW4, the first inductor L1, and the first capacitor C1 may function as a buck converter that uses the center voltage VM as an input. The third switch SW3, the fourth switch SW4, the first inductor L1, and the first capacitor C1 may perform buck conversion on the center voltage VM (e.g., the first output voltage VO1) and may generate the second output voltage VO2.

A level of the second output voltage VO2 may vary depending on a duty "D" (or a duty ratio) of the first and third signals S1 and S3 or a duty "1-D" (or a duty ratio) of the second and fourth signals S2 and S4. The switch controller SC may adjust the level of the second output voltage VO2 by adjusting the duty "D" (or the duty ratio) of the first and third signals S1 and S3 or the duty "1-D" (or the duty ratio) of the second and fourth signals S2 and S4. In the example embodiments illustrated in FIGS. 4 and 5, in which the ninth switch SW9 is turned on, and the tenth switch SW10 is turned off, if D equals to 0.5, the first, third, fifth, and seventh switches SW1, SW3, SW5, and SW7 may toggle in synchronization with each other, and the second, fourth, sixth, and eighth switches SW2, SW4, SW6, and SW8 may toggle in synchronization with each other and may be complementary to the first, third, fifth, and seventh switches, respectively.

As the duty "D" (or the duty ratio) of the first and third signals S1 and S3 increases or the duty "1-D" (or the duty ratio) of the second and fourth signals S2 and S4 decreases, the level of the second output voltage VO2 may increase. Conversely, as the duty "D" (or the duty ratio) of the first and third signals S1 and S3 decreases or the duty "1-D" (or the duty ratio) of the second and fourth signals S2 and S4 increases, the level of the second output voltage VO2 may decrease.

Because the first and third switches SW1 and SW3 and the second and fourth switches SW2 and SW4 toggle to be complementary to each other, the first to fourth switches SW1 to SW4 may reduce a ripple of the switched capacitor voltage division that is performed by the fifth to eighth switches SW5 to SW8. For example, the fifth to eighth switches SW5 to SW8 may function as a switched capacitor voltage divider of a first phase, and the first to fourth switches SW1 to SW4 may function as a switched capacitor voltage divider of a replica second phase.

In an example embodiment, the switch controller SC may adjust a duty ratio of the first and third signals S1 and S3 to 50% and may adjust a duty ratio of the second and fourth signals S2 and S4 to 50%. In this case, the first to eighth switches SW1 to SW8 may function as a fully 2-phase switched capacitor voltage divider, and thus, a ripple may be further suppressed. The level of the first output voltage VO1 may be half the level of the input voltage VIN, and the level of the second output voltage VO2 may be half the level of the first output voltage VO1.

Figure 6:
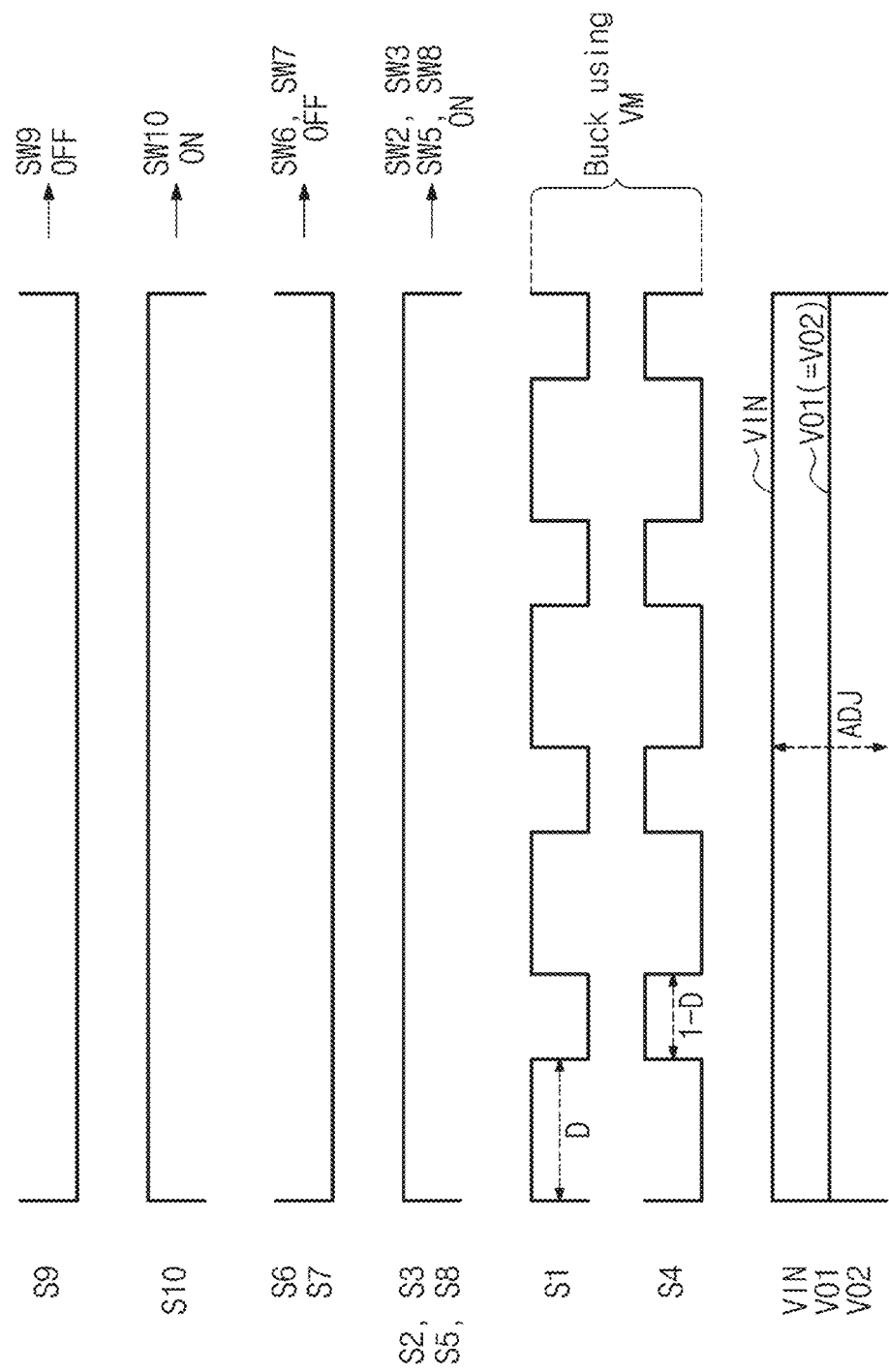
FIG. 6 illustrates an example illustrating how to control switches depending on a second type operation of a first mode.
Figure 7:
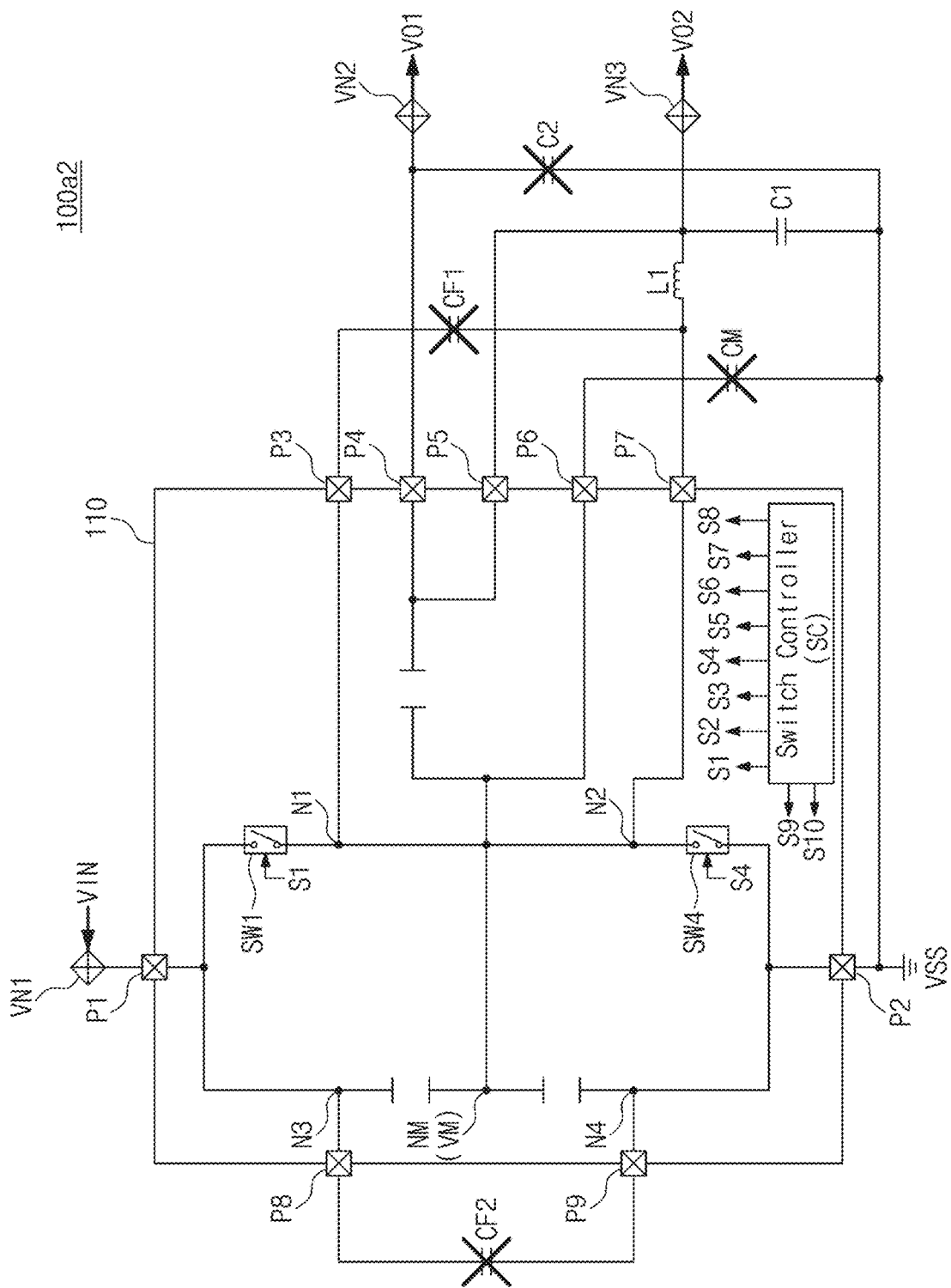
FIG. 7 illustrates a voltage converter modeled depending on a second type operation of a first mode.

FIG. 6 illustrates an example illustrating how to control switches depending on a second type operation in a first mode. FIG. 7 illustrates a voltage converter 100a2 modeled depending on a second type operation in a first mode. Referring to FIGS. 3, 6, and 7, the ninth signal S9 maintains the low level, and thus the ninth switch SW9 is turned off. Accordingly, the ninth switch SW9 is depicted as being open.

The tenth signal S10 maintains the high level, and the tenth switch SW10 is turned on. Accordingly, the tenth switch SW10 is depicted as being short-circuited. The sixth and seventh signals S6 and S7 may maintain the low level, and thus the sixth and seventh switches SW6 and SW7 are turned off. Accordingly, the sixth and seventh switches SW6 and SW7 are depicted as being open.

The second, third, fifth, and eighth signals S2, S3, S5, and S8 may maintain the high level, and thus the second, third, fifth, and eighth switches SW2, SW3, SW5, and SW8 are turned on. Accordingly, the second, third, fifth, and eighth switches SW2, SW3, SW5, and SW8 are depicted as being short-circuited.

As the second, third, fifth, eighth, and tenth switches SW2, SW3, SW5, SW8, and SW10 are short-circuited and the sixth, seventh, and ninth switches SW6, SW7, and SW9 are open, the first and second floating capacitors CF1 and CF2, the center capacitor CM, and the second capacitor C2 may not contribute to a voltage converting operation of the voltage converter 100a2. Accordingly, to describe the voltage converting operation of the voltage converter 100a2 briefly, the first and second floating capacitors CF1 and CF2, the center capacitor CM, and the second capacitor C2 are marked by "X" in FIG. 7.

The first signal S1 toggles between the low level and the high level. Accordingly, the first switch SW1 may toggle in synchronization with the first signal S1. The fourth signal S4 may toggle to be complementary to the first signal S1.

The first switch SW1, the fourth switch SW4, the first inductor L1, and the first capacitor C1 may function as a buck converter that uses the input voltage VIN as an input. The first switch SW1, the fourth switch SW4, the first inductor L1, and the first capacitor C1 may perform buck conversion on the input voltage VIN (e.g., the first output voltage VO1) and may generate the second output voltage VO2.

A level of the second output voltage VO2 may vary depending on a duty "D" (or a duty ratio) of the first signal S1 or a duty "1-D" (or a duty ratio) of the fourth signal S4. The switch controller SC may adjust the level of the second output voltage VO2 by adjusting the duty "D" (or the duty ratio) of the first signal S1 or the duty "1-D" (or the duty ratio) of the fourth signal S4.

For example, as the duty "D" (or the duty ratio) of the first signal S1 increases or the duty "1-D" (or the duty ratio) of the fourth signal S4 decreases, the level of the second output voltage VO2 may increase. Conversely, as the duty "D" (or the duty ratio) of the first signal S1 decreases or the duty "1-D" (or the duty ratio) of the fourth signal S4 increases, the level of the second output voltage VO2 may decrease.

The third voltage node VN3 is connected to the second voltage node VN2 through the fifth pad P5, the tenth switch SW10 that has been short-circuited, and the fourth pad P4. Accordingly, the first output voltage VO1 may be identical to the second output voltage VO2. In an example embodiment, the tenth switch SW10 may be turned off, and thus the first output voltage VO1 may not be output.

Figure 8:
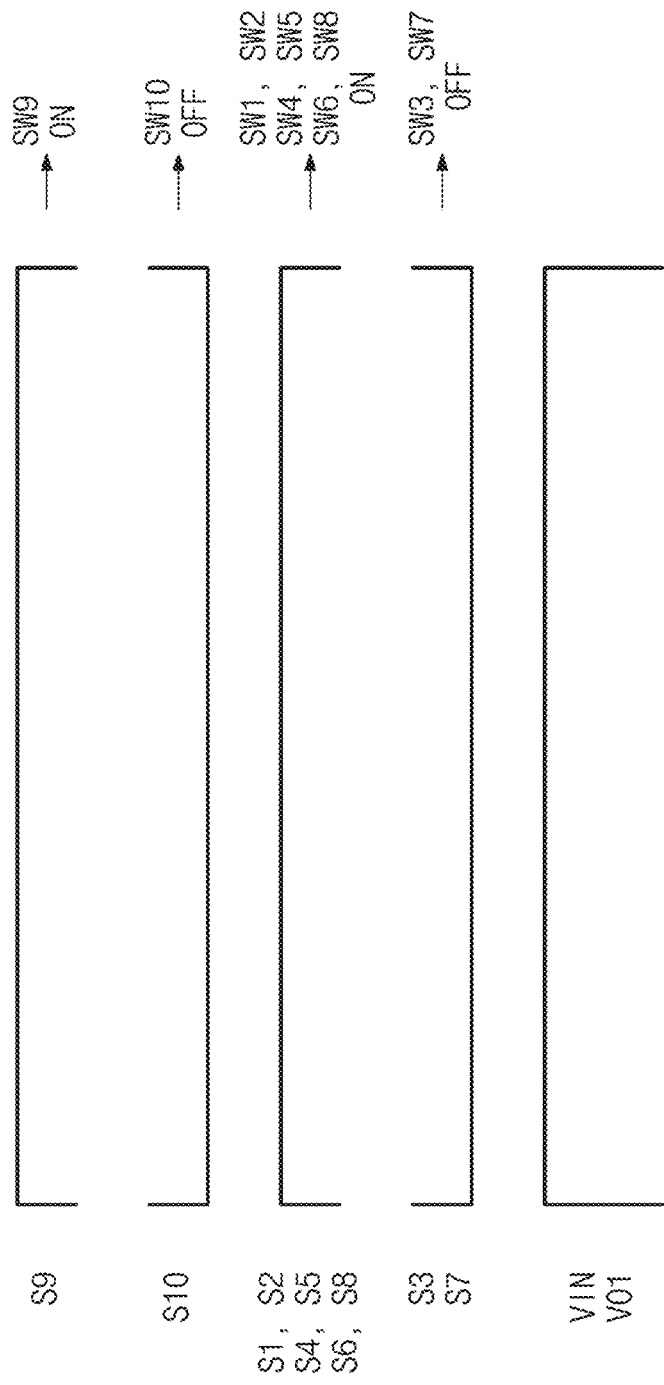
FIG. 8 illustrates an example illustrating how to control switches depending on a third type operation of a first mode.
Figure 9:
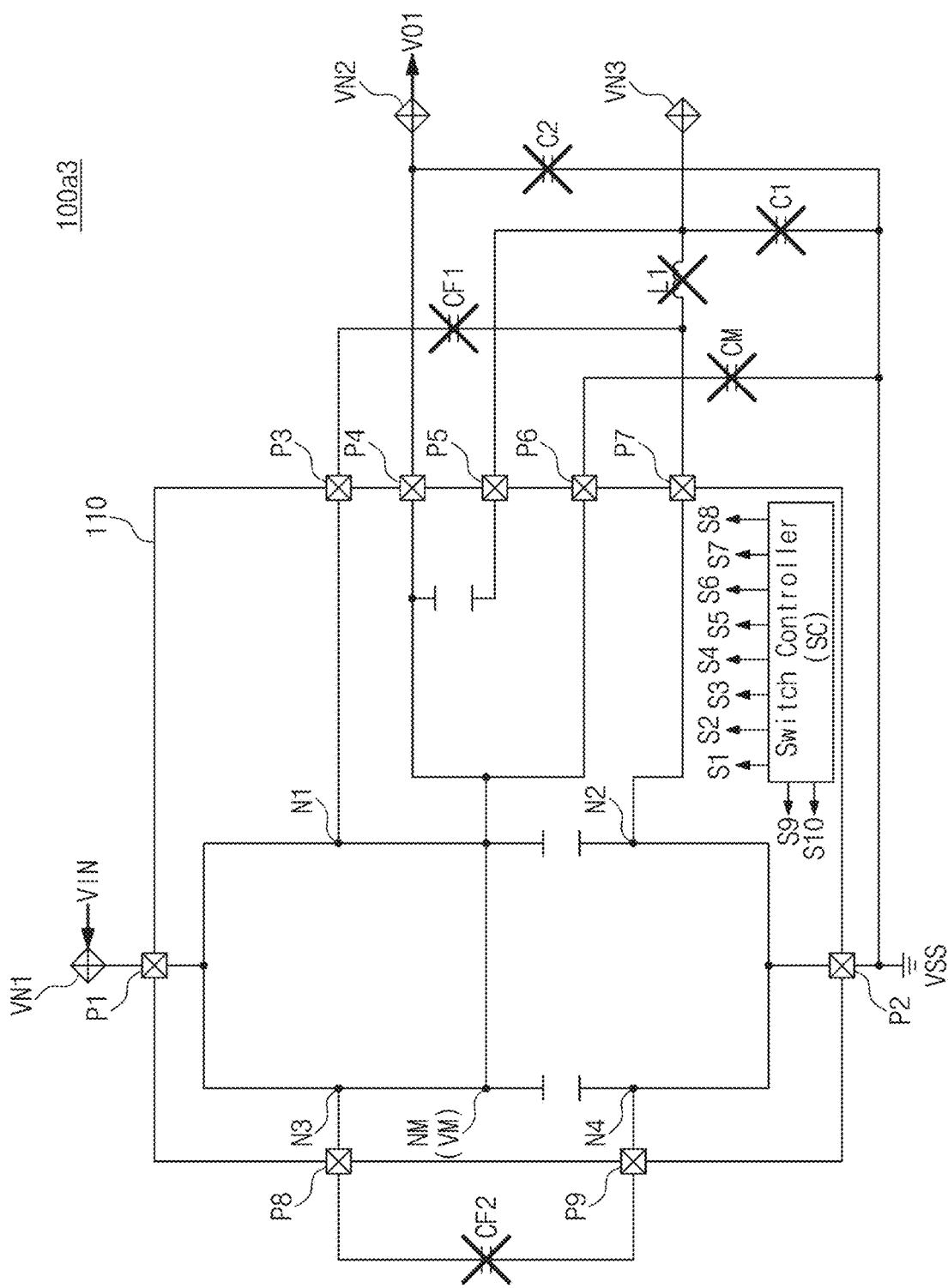
FIG. 9 illustrates a voltage converter modeled depending on a third type operation of a first mode.

FIG. 8 illustrates an example illustrating how to control switches depending on a third type operation in a first mode. FIG. 9 illustrates a voltage converter 100a3 modeled depending on a third type operation in a first mode. Referring to FIGS. 3, 8, and 9, first, second, fourth, fifth, sixth, eighth, and ninth signals S1, S2, S4, S5, S6, S8, and S9 are maintained at the high level. Accordingly, the first, second, fourth, fifth, sixth, eighth, and ninth switches SW1, SW2, SW4, SW5, SW6, SW8, and SW9 are turned on, and thus are depicted as being short-circuited.

The third, seventh, and tenth signals S3, S7, and S10 are maintained at the low level. Accordingly, the third, seventh, and tenth switches SW3, SW7, and SW10 are turned off, and thus are depicted as being open. In the third type operation of the first mode, the first and second floating capacitors CF1 and CF2, the center capacitor CM, the first and second capacitors C1 and C2, and the first inductor L1 may not contribute to a voltage converting operation of the voltage converter 100a3. Accordingly, to describe the voltage converting operation of the voltage converter 100a3 briefly, the first and second floating capacitors CF1 and CF2, the center capacitor CM, the first and second capacitors C1 and C2, and the first inductor L1 are marked by "X" in FIG. 9.

The first voltage node VN1 is connected to the second voltage node VN2 through the center node NM, the ninth switch SW9 that has been short-circuited, and the fourth pad P4. That is, the voltage converter 100a3 may transfer the input voltage VIN received at the first voltage node VN1 to the second voltage node VN2 so as to be output as the first output voltage VO1. For example, the voltage converter 100a3 may bypass any switched capacitor voltage divider circuitry, and provide the input voltage VIN of the first voltage node VN1 to the second voltage node VN2 without any voltage conversion.

In FIG. 9, the third voltage node VN3 is connected to the first voltage node VN1 through the first floating capacitor CF1 and the first inductor L1 and is connected to the ground node through the first capacitor C1. Even though the first floating capacitor CF1, the first inductor L1 and the first capacitor C1 is marked by "X", the mark X is conceptual (meaning that such components do not contribute to a voltage converting operation of the voltage converter 100a3), and does not mean the marked element does not work. Thus, in the case where a device connected to the third voltage node VN3 desires a resonant circuit including the first floating capacitor CF1, the first inductor L1, and the first capacitor C1, the third voltage node VN3 may be components of the desired resonant circuit.

In an example embodiment, when the tenth signal S10 is maintained at the high level, the third voltage node VN3 may be electrically connected with the first voltage node VN1. The voltage converter 100a3 may be modified to bypass any switched capacitor voltage divider circuitry, and provide the input voltage VIN to the third voltage node VN3 by maintaining the tenth signal S10 at the high level such that the tenth switch SW10 is turned on.

In the above example embodiments, elements viewed together with "X" are described as not contributing to a voltage converting operation. However, the elements may contribute to at least a portion of an operation of a voltage converter in the form of contributing voltage stabilization, and this contribution is not described in detail for the sake of simplicity.

Figure 10:
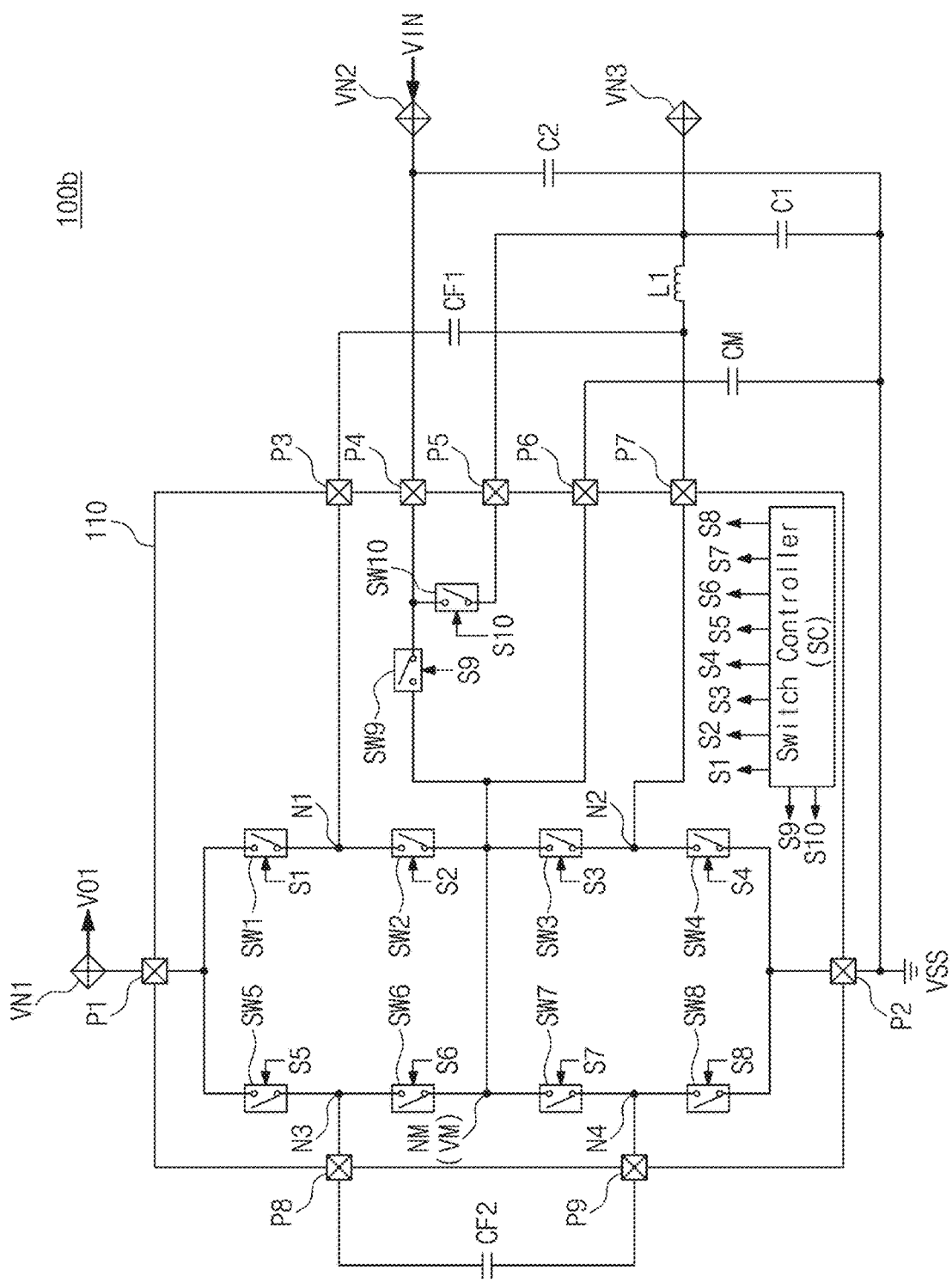
FIG. 10 illustrates a voltage converter set to a second mode.

FIG. 10 illustrates a voltage converter 100b set to a second mode. Referring to FIG. 10, in the second mode, the voltage converter 100b may receive the input voltage VIN at the second voltage node VN2. The voltage converter 100b may use the first voltage node VN1 as an output. For example, the voltage converter 100b may output the first output voltage VO1 at the first voltage node VN1.

Figure 11:
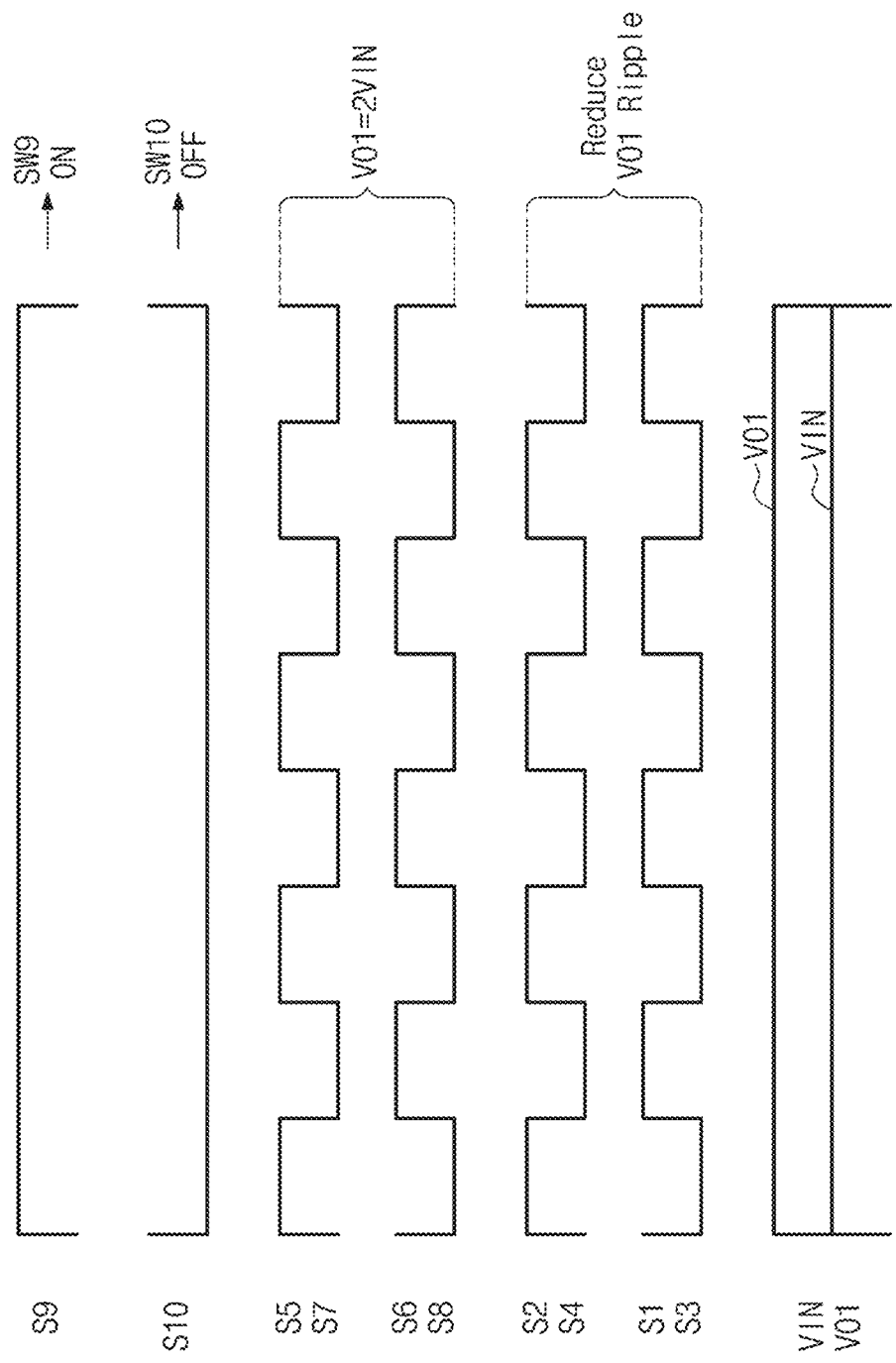
FIG. 11 illustrates an example illustrating how to control switches depending on a first type operation of a second mode.
Figure 12:
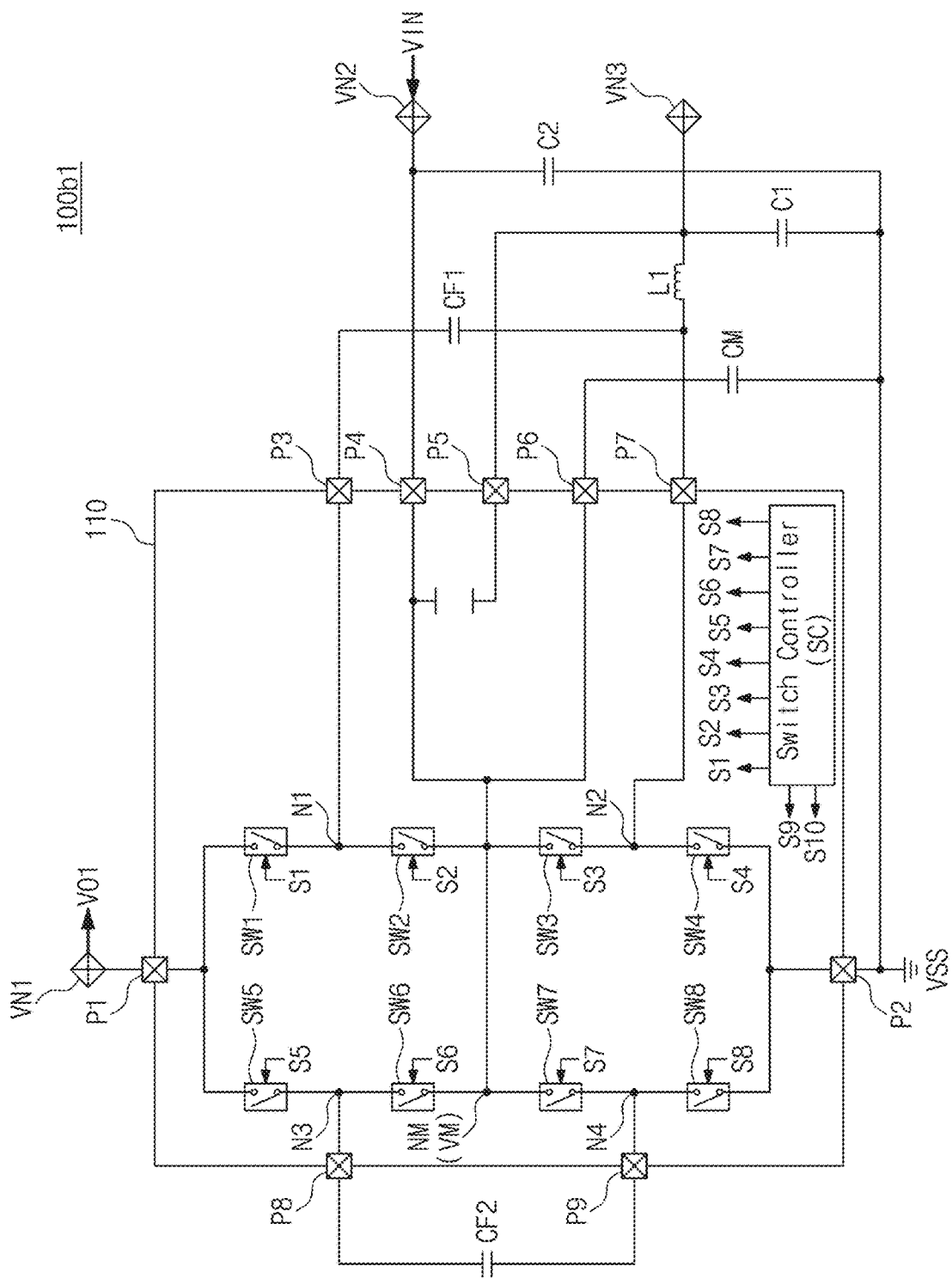
FIG. 12 illustrates a voltage converter modeled depending on a first type operation of a second mode.

FIG. 11 illustrates an example illustrating how to control switches depending on a first type operation in a second mode. FIG. 12 illustrates a voltage converter 100b1 modeled depending on a first type operation in a second mode.

Referring to FIGS. 10, 11, and 12, the ninth signal S9 maintains the high level, and thus the ninth switch SW9 is turned on. Accordingly, the ninth switch SW9 is depicted as being short-circuited.

The tenth signal S10 maintains the low level, and thus the tenth switch SW10 is turned off. Accordingly, the tenth switch SW10 is depicted as being open. The fifth and seventh signals S5 and S7 toggle between the low level and the high level in synchronization with each other. Accordingly, the fifth and seventh switches SW5 and SW7 toggle (or switch) between turn-on and turn-off in synchronization with each other. For example, a duty ratio of the fifth and seventh signals S5 and S7 may be 50%.

The sixth and eighth signals S6 and S8 toggle between the low level and the high level in synchronization with each other. The sixth and eighth signals S6 and S8 may toggle to be complementary to the fifth and seventh signals S5 and S7. Accordingly, the sixth and eighth switches SW6 and SW8 may toggle to be complementary to the fifth and seventh switches SW5 and SW7.

In response to the fifth to eighth signals S5 to S8, the fifth to eighth switches SW5 to SW8 operate as a switched capacitor voltage doubler. The fifth to eighth switches SW5 to SW8 may double a voltage of the input voltage VIN transferred to the center node NM and may output the doubled voltage through the first voltage node VN1 as the first output voltage VO1.

The first and third signals S1 and S3 toggle between the low level and the high level in synchronization with each other. Accordingly, the first to third switches SW1 and SW3 may toggle in synchronization with each other. The second and fourth signals S2 and S4 may toggle in synchronization with each other. The second and fourth signals S2 and S4 may toggle to be complementary to the first and third signals S1 and S3. Accordingly, the second and fourth switches SW2 and SW4 may toggle in synchronization with each other, and may toggle to be complementary to the first and third switches SW1 and SW3. For example, a duty ratio of each of the first to fourth signals S1 to S4 may be 50%.

The first and third signals S1 and S3 may be synchronized with the sixth and eighth signals S6 and S8. The second and fourth signals S2 and S4 may be synchronized with the fifth and seventh signals S5 and S7. The fifth to eighth switches SW5 to SW8 may operate as a voltage doubler of a first phase, and the first to fourth switches SW1 to SW4 may operate as a voltage doubler of a second phase. That is, the voltage converter 100b may operate as a 2-phase voltage doubler. Accordingly, a ripple of the first output voltage VO1 may be suppressed.

Figure 13:
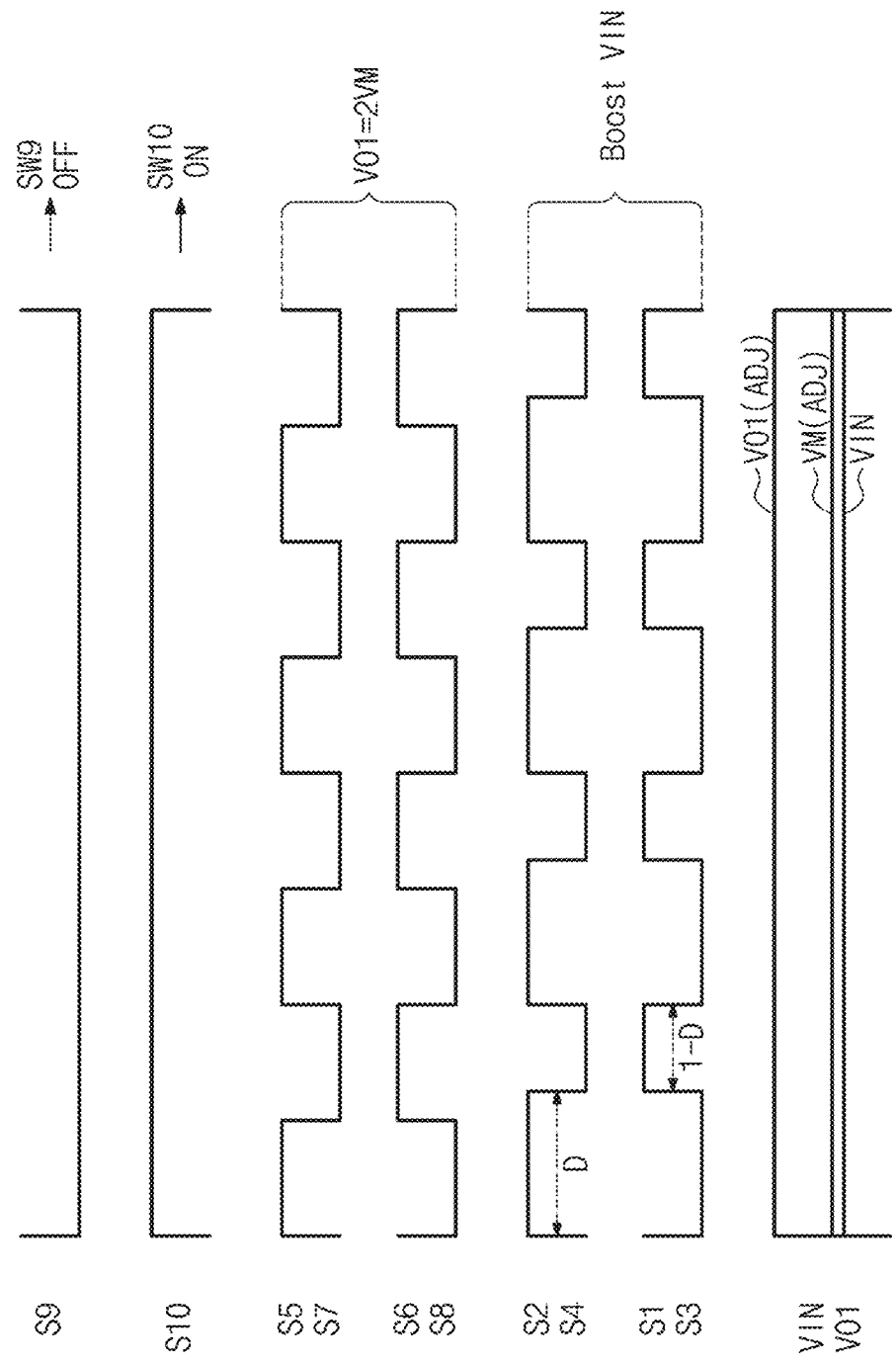
FIG. 13 illustrates an example illustrating how to control switches depending on a second type operation of a second mode.
Figure 14:
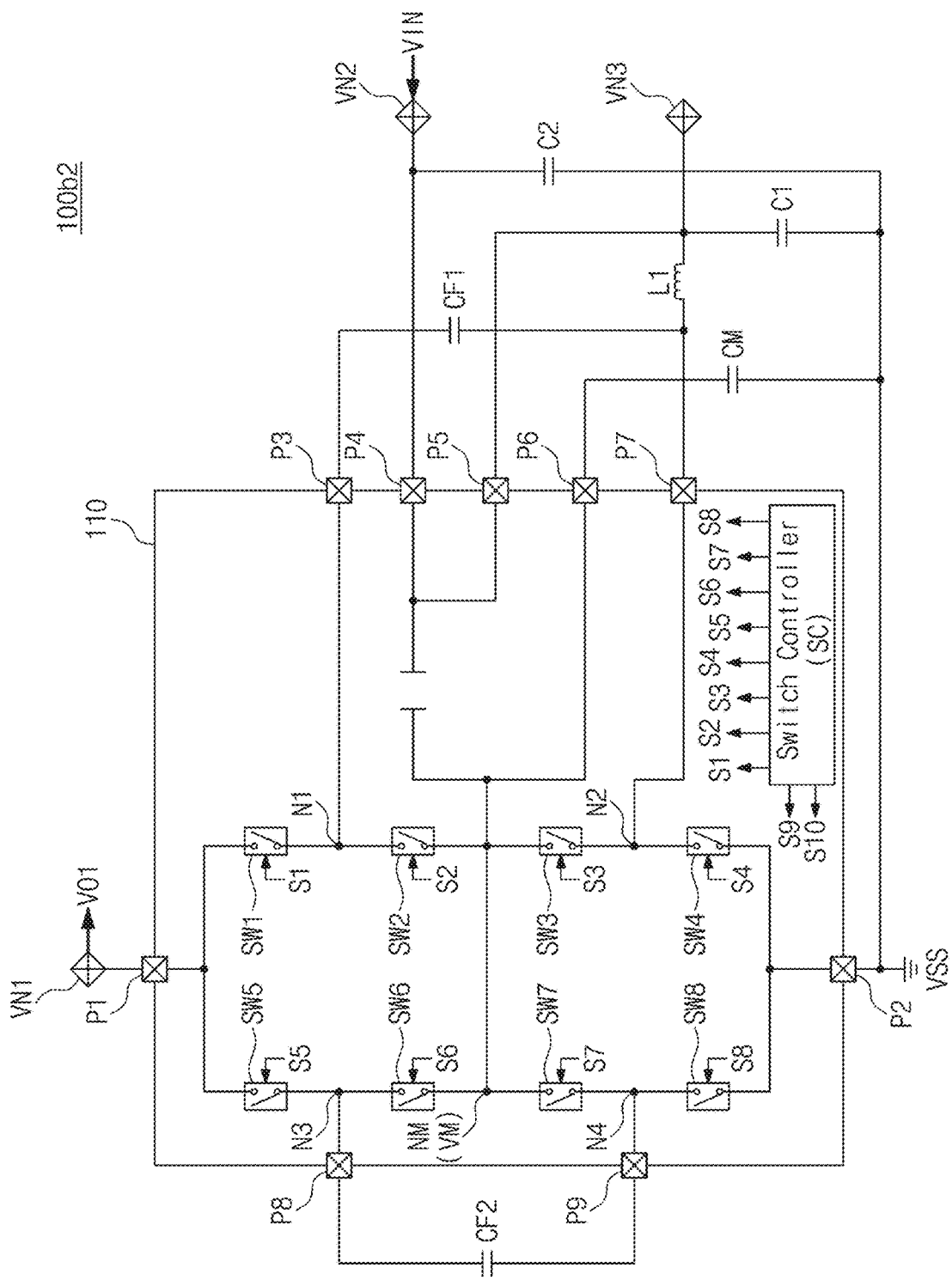
FIG. 14 illustrates a voltage converter modeled depending on a second type operation of a second mode.

FIG. 13 illustrates an example illustrating how to control switches depending on a second type operation in a second mode. FIG. 14 illustrates a voltage converter 100b2 modeled depending on a second type operation in a second mode. Referring to FIGS. 10, 13, and 14, the ninth signal S9 maintains the low level, and thus the ninth switch SW9 is turned off. Accordingly, the ninth switch SW9 is depicted as being open.

The tenth signal S10 maintains the high level, and thus the tenth switch SW10 is turned on. Accordingly, the tenth switch SW10 is depicted as being short-circuited. The fifth and seventh signals S5 and S7 toggle between the low level and the high level in synchronization with each other. Accordingly, the fifth and seventh switches SW5 and SW7 toggle (or switch) between turn-on and turn-off in synchronization with each other. For example, a duty ratio of the fifth and seventh signals S5 and S7 may be 50%.

The sixth and eighth signals S6 and S8 toggle between the low level and the high level in synchronization with each other. The sixth and eighth signals S6 and S8 may toggle to be complementary to the fifth and seventh signals S5 and S7. Accordingly, the sixth and eighth switches SW6 and SW8 may toggle to be complementary to the fifth and seventh switches SW5 and SW7.

In response to the fifth to eighth signals S5 to S8, the fifth to eighth switches SW5 to SW8 operate as a switched capacitor voltage doubler. The fifth to eighth switches SW5 to SW8 may double a voltage of the center voltage VM of the center node NM and may output the doubled voltage through the first voltage node VN1 as the first output voltage VO1.

The first and third signals S1 and S3 toggle between the low level and the high level in synchronization with each other. Accordingly, the first to third switches SW1 and SW3 may toggle in synchronization with each other. The second and fourth signals S2 and S4 may toggle in synchronization with each other. The second and fourth signals S2 and S4 may toggle to be complementary to the first and third signals S1 and S3. Accordingly, the second and fourth switches SW2 and SW4 may toggle in synchronization with each other and may toggle to be complementary to the first and third switches SW1 and SW3. The third switch SW3, the fourth switch SW4, the first inductor L1, and the center capacitor CM may function as a boost converter that steps up (or boosts) the input voltage VIN of the second voltage node VN2. The third switch SW3, the fourth switch SW4, the first inductor L1, and the center capacitor CM may perform boost conversion on the input voltage VIN and may generate the center voltage VM.

A level of the center voltage VM may vary depending on a duty "1-D" (or a duty ratio) of the first and third signals S1 and S3 or a duty "D" (or a duty ratio) of the second and fourth signals S2 and S4. The switch controller SC may adjust the level of the center voltage VM by adjusting the duty "1-D" (or the duty ratio) of the first and third signals S1 and S3 or the duty "D" (or the duty ratio) of the second and fourth signals S2 and S4.

As the duty "1-D" (or the duty ratio) of the first and third signals S1 and S3 increases or the duty "D" (or the duty ratio) of the second and fourth signals S2 and S4 decreases, the level of the center voltage VM may decrease. Conversely, as the duty "1-D" (or the duty ratio) of the first and third signals S1 and S3 decreases or the duty "D" (or the duty ratio) of the second and fourth signals S2 and S4 increases, the level of the center voltage VM may increase. In the example embodiments illustrated in FIGS. 13 and 14, in which the ninth switch SW9 is turned off, and the tenth switch SW10 is turned on, if D equals 0.5, the first, third, fifth, and seventh switches SW1, SW3, SW5, and SW7 may toggle in synchronization with each other, and the second, fourth, sixth, and eighth switches SW2, SW4, SW6, and SW8 may toggle in synchronization with each other and may be complementary to the first, third, fifth, and seventh switches, respectively.

That is, the first to fourth switches SW1 to SW4 may perform boost conversion on the input voltage VIN of the second voltage node VN2, and may generate the center voltage VM. The fifth to eighth switches SW5 to SW8 may double the center voltage VM and may output the doubled voltage through the first voltage node VN1 as the first output voltage VO1. A level of the first output voltage VO1 may be equal to or greater than two times the level of the input voltage VIN.

Because the first and third switches SW1 and SW3 and the second and fourth switches SW2 and SW4 toggle to be complementary to each other, the first to fourth switches SW1 to SW4 may reduce a ripple due to the switched capacitor voltage double operation that is performed by the fifth to eighth switches SW5 to SW8. For example, the fifth to eighth switches SW5 to SW8 may function as a switched capacitor voltage doubler of a first phase, and the first to fourth switches SW1 to SW4 may function as a switched capacitor voltage doubler of a replica second phase.

In an example embodiment, the switch controller SC may adjust a duty ratio of the first and third signals S1 and S3 to 50% and may adjust a duty ratio of the second and fourth signals S2 and S4 to 50%. In this case, the first to eighth switches SW1 to SW8 may function as a fully 2-phase switched capacitor voltage doubler, and thus, a ripple may be further suppressed.

Figure 15:
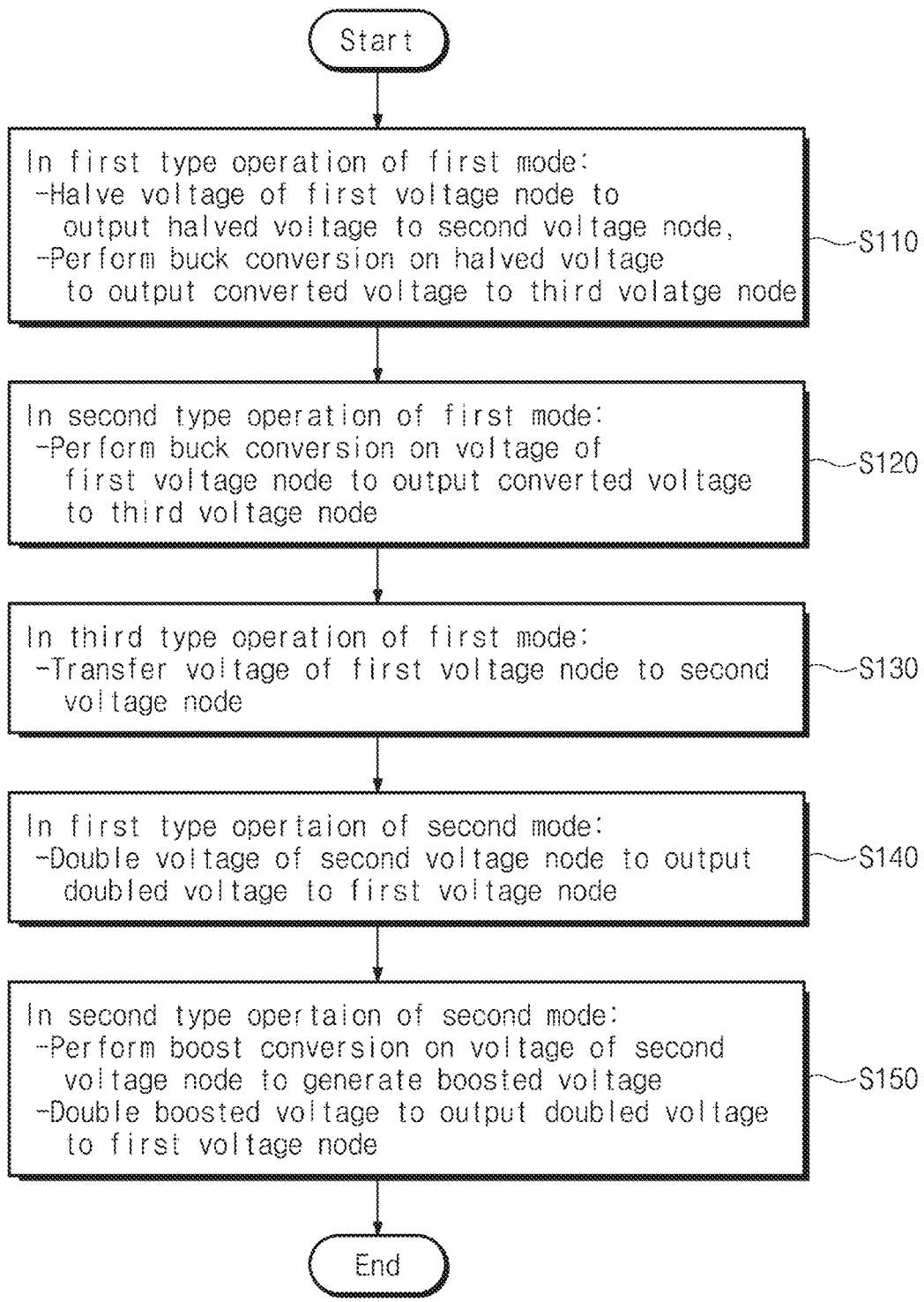
FIG. 15 illustrates an operating method of a voltage converter according to the first embodiment.

FIG. 15 illustrates an operating method of the voltage converter 100 according to the first example embodiment. Referring to FIGS. 2 and 15, in operation S110, the voltage converter 100 may perform the first type operation of the first mode. In the first type operation of the first mode, the voltage converter 100 may halve a voltage of the first voltage node VN1 and may output the halved voltage to the second voltage node VN2. Further, the voltage converter 100 may perform buck conversion on the halved voltage and may output the converted voltage to the third voltage node VN3.

In operation S120, the voltage converter 100 may perform the second type operation of the first mode. In the second type operation of the first mode, the voltage converter 100 may perform buck conversion on a voltage of the first voltage node VN1 and may output the converted voltage to the third voltage node VN3 (and/or the second voltage node VN2).

In operation S130, the voltage converter 100 may perform the third type operation of the first mode. In the third type operation of the first mode, the voltage converter 100 may transfer the voltage of the first voltage node VN1 to the second voltage node VN2.

In operation S140, the voltage converter 100 may perform the first type operation of the second mode. In the first type operation of the second mode, the voltage converter 100 may double a voltage of the second voltage node VN2 and may output the doubled voltage to the first voltage node VN1.

In operation S150, the voltage converter 100 may perform the second type operation of the second mode. In the second type operation of the second mode, the voltage converter 100 may perform boost conversion on the voltage of the second voltage node VN2 to generate the boosted voltage. Further, the voltage converter 100 may double the boosted voltage and may output the doubled voltage to the first voltage node VN1.

As described above, the voltage converter 100 may be configured to perform various buck conversions, boost conversions, and bypass transfer. Accordingly, the voltage converter 100 may be available in various environments with high flexibility and may be used to replace a plurality of voltage converters.

For example, in the first type operation of the first mode, the first type operation of the second mode, and the second type operation of the second mode, each of the first to third voltage nodes VN1 to VN3 is connected to a ground node through at least two switches. Accordingly, a voltage level that each switch has to endure may decrease to half the level of the maximum voltage used in the voltage converter 100, and thus a breakdown characteristic of each switch may be improved.

In an example embodiment, switches that are used in the voltage converter 100 may be implemented with an NMOS transistor, a PMOS transistor, or a combination thereof. Depending on an environment where the voltage converter 100 is used and a desired form factor, the switches may be implemented by an NMOS transistor, a PMOS transistor, or a combination thereof.

Figure 16:
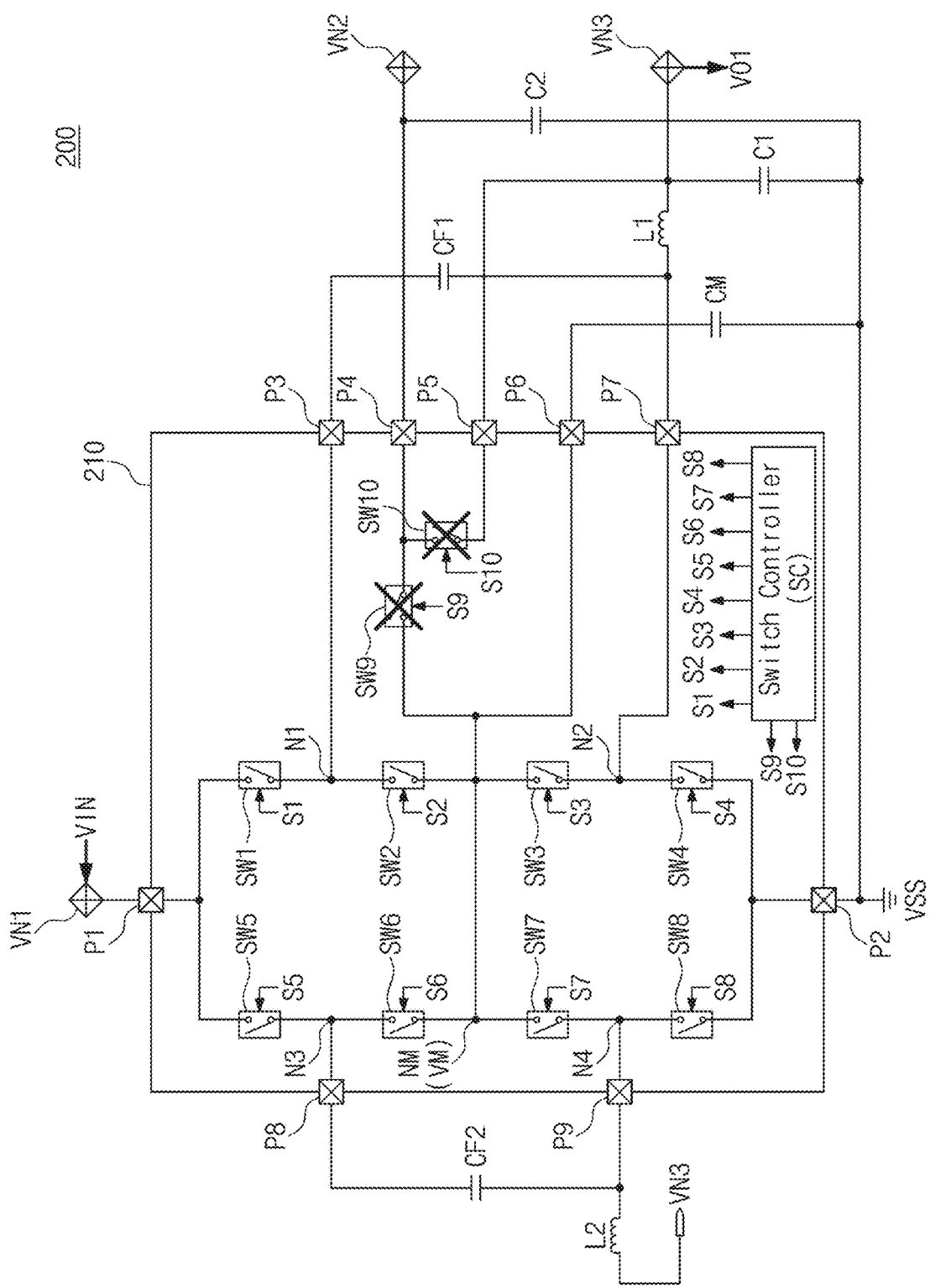
FIG. 16 illustrates a voltage converter according to a second example embodiment.

FIG. 16 illustrates a voltage converter 200 according to a second example embodiment. An integrated circuit 210 of the voltage converter 200 may be the same as or substantially similar to the integrated circuit 110 of the voltage converter 100 of FIG. 2. Compared with the voltage converter 100 of FIG. 2, the voltage converter 200 further includes a second inductor L2 connected to the ninth pad P9 and a wire connecting the second inductor L2 and the third voltage node VN3.

The switch controller SC may control the ninth and tenth signals S9 and S10 such that the ninth and tenth switches SW9 and SW10 are always turned off. Accordingly, in FIG. 16, the ninth and tenth switches SW9 and SW10 are depicted together with "X".

As described with reference to FIGS. 4 and 5, the third switch SW3, the fourth switch SW4, the first inductor L1, and the first capacitor C1 may operate as a buck converter of a first phase. The seventh switch SW7, the eighth switch SW8, the second inductor L2, and the first capacitor C1 may operate as a buck converter of a second phase.

That is, the voltage converter 200 may operate as a 2-phase buck converter. The switch controller SC may control the first to eighth signals S1 to S8 such that the voltage converter 200 operates as a 2-phase buck converter.

For example, the switch controller SC may control the first, second, fifth, and sixth signals S1, S2, S5, and S6 such that the first, second, fifth, and sixth switches SW1, SW2, SW5, and SW6 are respectively synchronized with the third, fourth, seventh, and eighth switches SW3, SW4, SW7, and SW8. In some example embodiments, the switch controller SC may control the first, second, fifth, and sixth signals S1, S2, S5, and S6 such that the first, second, fifth, and sixth switches SW1, SW2, SW5, and SW6 maintain a turn-on state.

For another example, as described with reference to FIGS. 6 and 7, the switch controller SC may implement a buck converter of a first phase by allowing the first and fourth switches SW1 and SW4 to toggle complementarily while the second and third switches SW2 and SW3 are maintained at a turn-on state. The switch controller SC may implement a buck converter of a second phase by allowing the fifth and eighth switches SW5 and SW8 to toggle complementarily while the sixth and seventh switches SW6 and SW7 are maintained at a turn-on state.

In an example embodiment, in the case where the integrated circuit 210 is configured to operate as a 2-phase buck converter, components not contributing to a conversion function of the 2-phase buck converter, for example, the first and second floating capacitors CF1 and CF2, the center capacitor CM, and the second capacitor C2 may be removed. For example, the integrated circuit 210 may be implemented as a 2-phase buck converter by connecting the first and second inductors L1 and L2 and the first capacitor C1 to the integrated circuit 210.

In an example embodiment, the voltage converter 200 may be implemented as a 2-phase boost converter. When a voltage is input from the third voltage node VN3, the voltage converter 200 may boost the input voltage and may output the boosted voltage at the first voltage node VN1. For example, the second inductor L2 and the center capacitor CM may form a boost converter of a first phase together with the seventh and eighth switches SW7 and SW8 toggling, and the first inductor L1 and the center capacitor CM may form a boost converter of a second phase together with the third and fourth switches SW3 and SW4 toggling.

Figure 17:
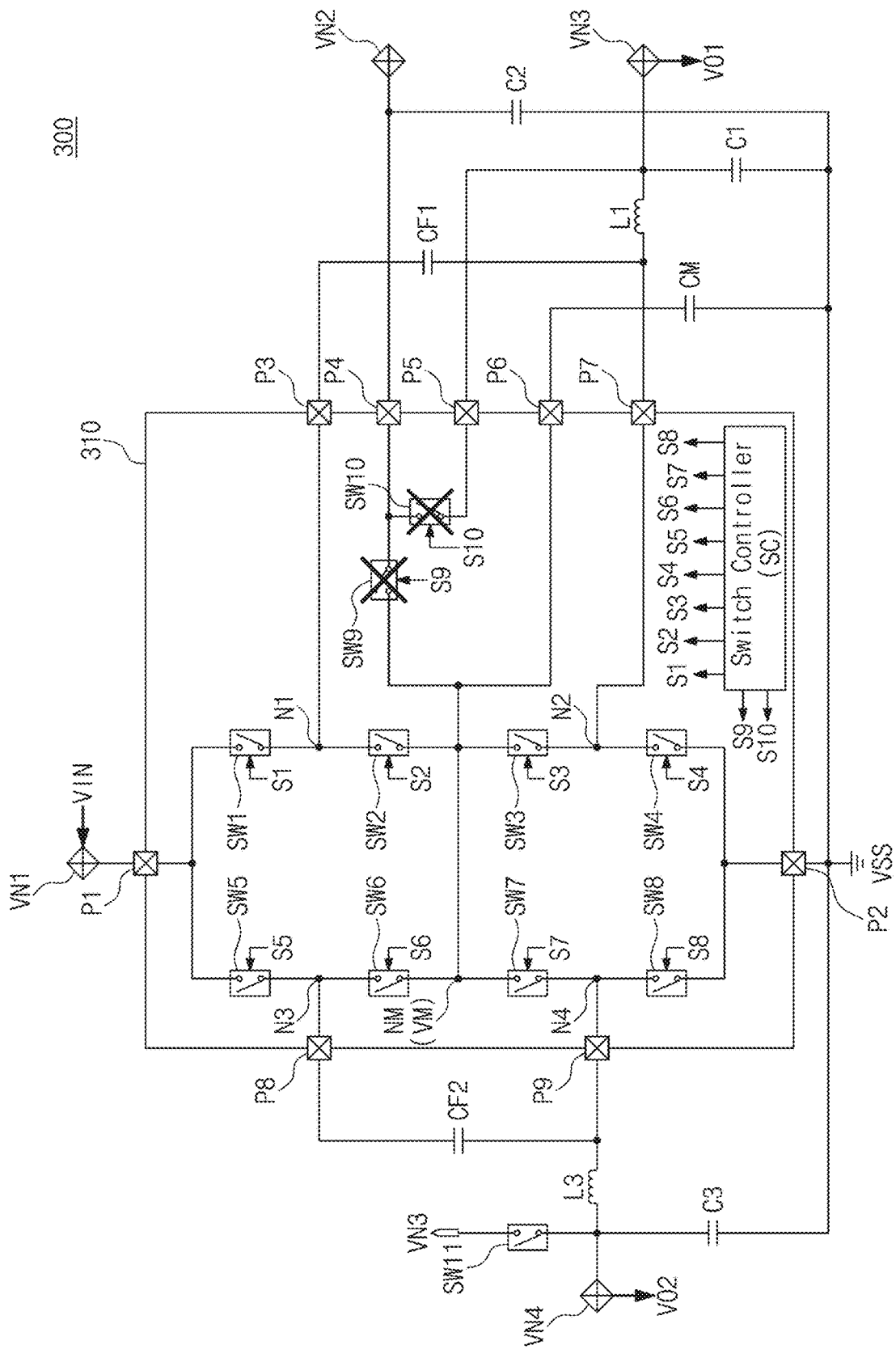
FIG. 17 illustrates a voltage converter according to a third example embodiment.

FIG. 17 illustrates a voltage converter 300 according to a third example embodiment. An integrated circuit 310 of the voltage converter 300 may be the same as or substantially similar to the integrated circuit 110 of the voltage converter 100 of FIG. 2. Compared with the voltage converter 100 of FIG. 2, the voltage converter 300 may further include a third inductor L3 connected to the ninth pad P9, an eleventh switch SW11 connected between the third inductor L3 and the third voltage node VN3, a fourth voltage node VN4 connected to the third inductor L3, and a third capacitor C3 connected between the fourth voltage node VN4 and the ground node.

As described with reference to FIG. 16, the switch controller SC may control the ninth and tenth signals S9 and S10 such that the ninth and tenth switches SW9 and SW10 are always turned off. Accordingly, in FIG. 17, the ninth and tenth switches SW9 and SW10 are depicted together with "X".

The eleventh switch SW11 may be controlled by the switch controller SC. In some example embodiments, the eleventh switch SW11 may be included within the integrated circuit 310 and may be connected with external elements through pads. When the eleventh switch SW11 is turned on, the voltage converter 300 may operate as a 2-phase buck converter (or a 2-phase boost converter) (refer to FIG. 16).

When the eleventh switch SW11 is turned off, the third and fourth switches SW3 and SW4 may operate as one buck converter together with the first inductor L1 and the first capacitor C1, and the seventh and eighth switches SW7 and SW8 may operate as another buck converter together with the third inductor L3 and the third capacitor C3. That is, the voltage converter 300 may operate as two buck converters.

The buck converter including the seventh and eighth switches SW7 and SW8 may output the second output voltage VO2 through the fourth voltage node VN4. In an example embodiment, in the case where the eleventh switch SW11 is removed from the voltage converter 300, a mode in which the voltage converter 300 operates as a 2-phase buck converter may be removed, and the voltage converter 300 may operate only as two buck converters. Some components that do not contribute to a voltage converting operation may be removed.

Figure 18:
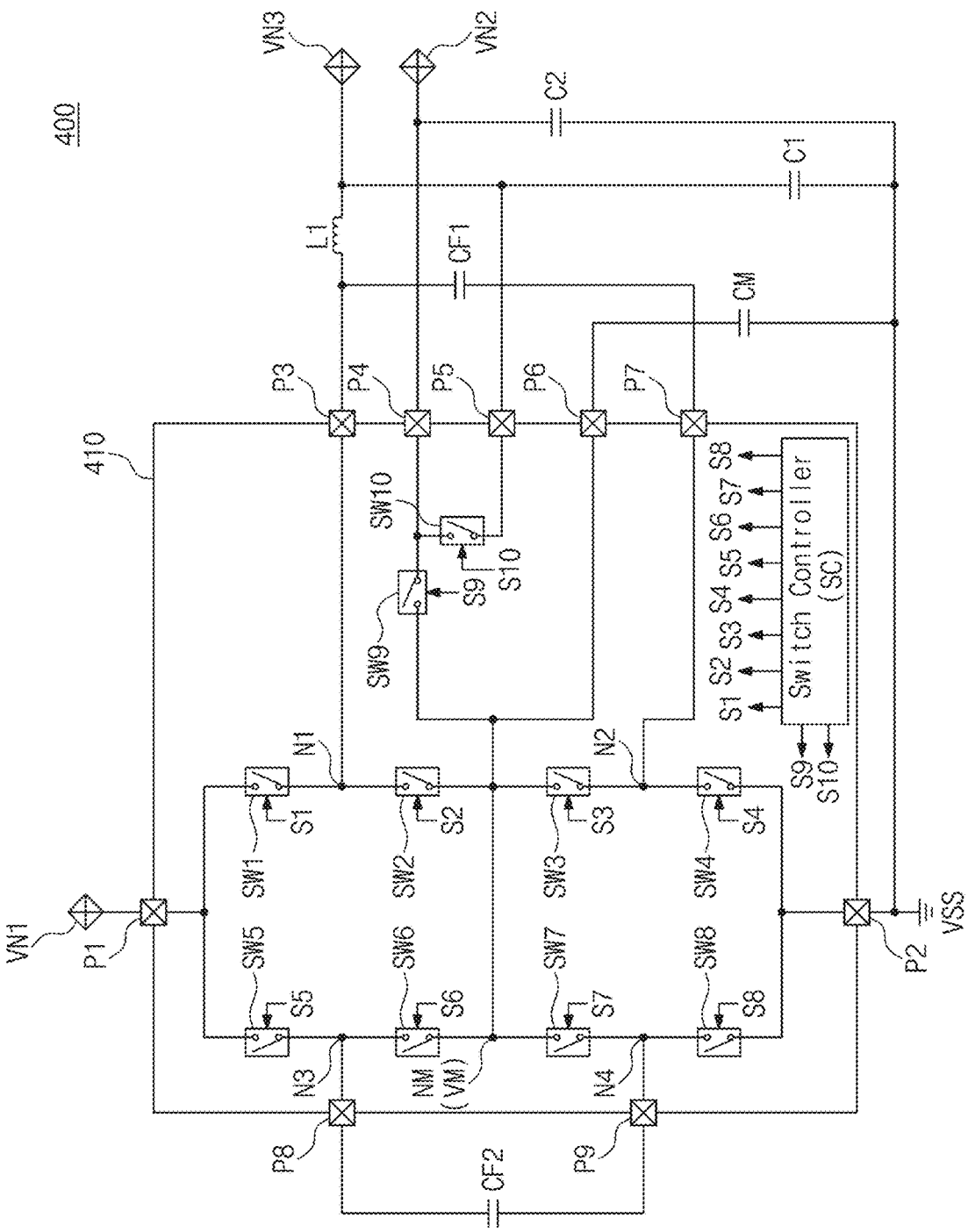
FIG. 18 illustrates a voltage converter according to a fourth example embodiment.

FIG. 18 illustrates a voltage converter 400 according to a fourth example embodiment. An integrated circuit 410 of the voltage converter 400 may be the same as or substantially similar to the integrated circuit 110 of the voltage converter 100 of FIG. 2. Compared with the voltage converter 100 of FIG. 2, the first inductor L1 and the third voltage node VN3 of the voltage converter 400 may be connected with the third pad P3, not the seventh pad P7.

As described with reference to FIGS. 3 to 9, the voltage converter 400 may operate in the first mode in which the input voltage VIN is received at the first voltage node VN1. Further, as described with reference to FIGS. 4 and 5, the voltage converter 400 may perform the first type operation of the first mode.

In the first type operation of the first mode, the fifth to eighth switches SW5 to SW8 may operate as a switched capacitor voltage divider. The fifth to eighth switches SW5 to SW8 may output a voltage corresponding to half the input voltage VIN through the second voltage node VN2 as the first output voltage VO1.

Further, the first and second switches SW1 and SW2 may perform buck conversion on the input voltage VIN. The first and second switches SW1 and SW2 may output the stepped-down voltage at the third voltage node VN3 as the second output voltage VO2. The second output voltage VO2 may have a level between the first output voltage VO1 and the input voltage VIN.

As described with reference to FIGS. 6 and 7, the voltage converter 400 may perform the second type operation of the first mode. In the second type operation of the first mode, the voltage converter 400 may perform bulk conversion on the input voltage VIN, and may output the stepped-down voltage at the second voltage node VN2 and the third voltage node VN3 as the first output voltage VO1 and the second output voltage VO2, respectively.

As described with reference to FIGS. 8 and 9, the voltage converter 400 may perform the third type operation of the first mode. In the third type operation of the first mode, the voltage converter 400 may bypass any switched capacitor voltage divider circuitry and output the input voltage VIN to the second voltage node VN2 without any voltage conversion.

Figure 19:
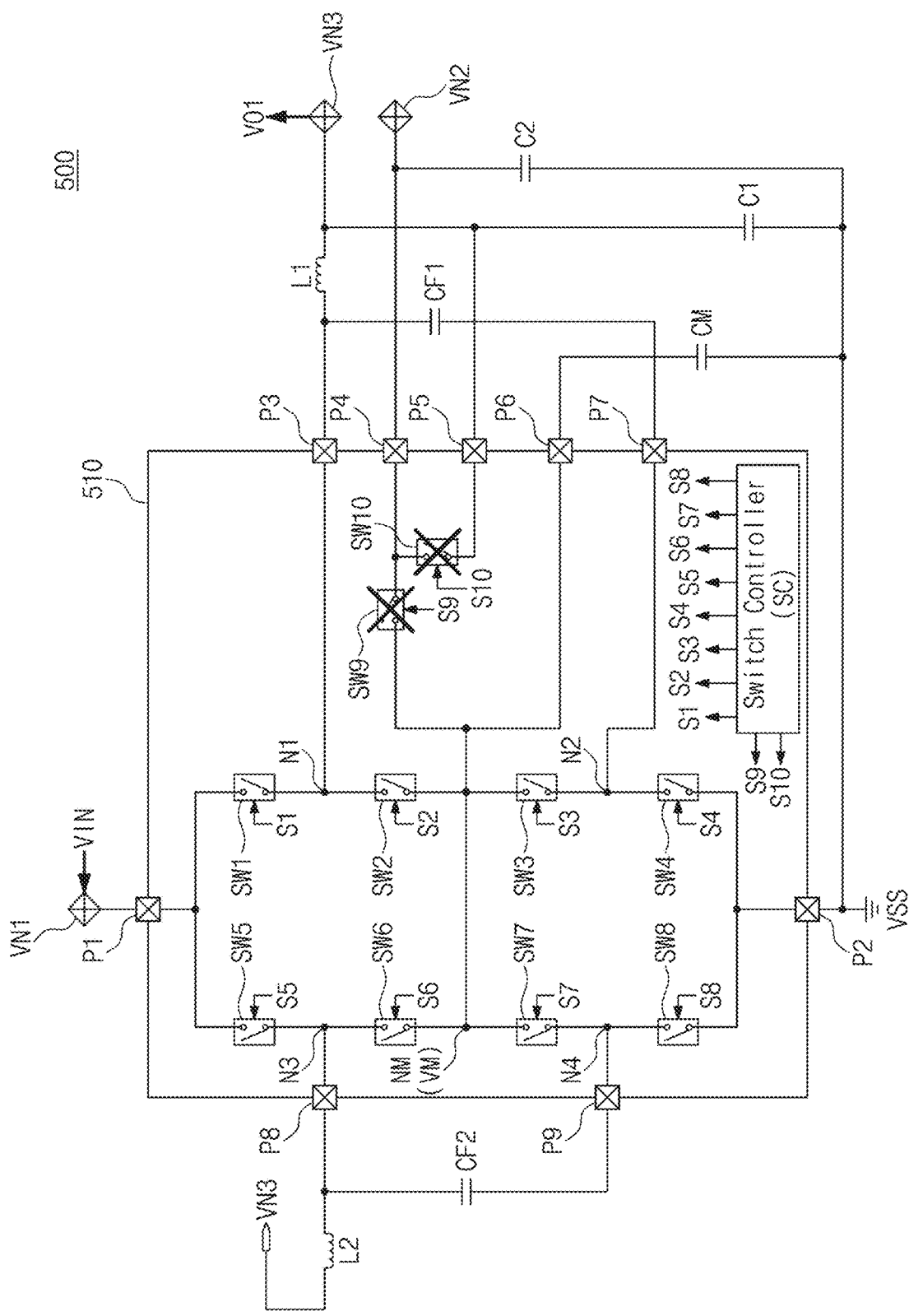
FIG. 19 illustrates a voltage converter according to a fifth example embodiment.

FIG. 19 illustrates a voltage converter 500 according to a fifth example embodiment. An integrated circuit 510 of the voltage converter 500 may be the same as or substantially similar to the integrated circuit 110 of the voltage converter 100 of FIG. 2. Compared with the voltage converter 400 of FIG. 18, the voltage converter 500 further includes a second inductor L2 connected to the eighth pad P8 and a wire connecting the second inductor L2 and the third voltage node VN3.

The switch controller SC may control the ninth and tenth signals S9 and S10 such that the ninth and tenth switches SW9 and SW10 are always turned off. Accordingly, in FIG. 19, the ninth and tenth switches SW9 and SW10 are depicted together with "X".

As described with reference to FIGS. 4 and 5, the third switch SW3, the fourth switch SW4, the first inductor L1, and the first capacitor C1 may operate as a buck converter of a first phase. The seventh switch SW7, the eighth switch SW8, the second inductor L2, and the first capacitor C1 may operate as a buck converter of a second phase.

That is, the voltage converter 500 may operate as a 2-phase buck converter. The switch controller SC may control the first to eighth signals S1 to S8 such that the voltage converter 500 operates as a 2-phase buck converter.

For example, the switch controller SC may control the first, second, fifth, and sixth signals S1, S2, S5, and S6 such that the first, second, fifth, and sixth switches SW1, SW2, SW5, and SW6 are synchronized with the third, fourth, seventh, and eighth switches SW3, SW4, SW7, and SW8, respectively. In some example embodiments, the switch controller SC may control the first, second, fifth, and sixth signals S1, S2, S5, and S6 such that the first, second, fifth, and sixth switches SW1, SW2, SW5, and SW6 maintain a turn-on state.

For another example, as described with reference to FIGS. 6 and 7, the switch controller SC may implement a buck converter of a first phase by allowing the first and fourth switches SW1 and SW4 to toggle complementarily while the second and third switches SW2 and SW3 are maintained at a turn-on state. The switch controller SC may implement a buck converter of a second phase by allowing the fifth and eighth switches SW5 and SW8 to toggle complementarily while the sixth and seventh switches SW6 and SW7 are maintained at a turn-on state.

In an example embodiment, in the case where the voltage converter 500 is configured to operate as a 2-phase buck converter, components not contributing to a conversion function of the 2-phase buck converter, for example, the first and second floating capacitors CF1 and CF2, the center capacitor CM, and the second capacitor C2 may be removed. That is, the integrated circuit 510 may be implemented as a 2-phase buck converter by connecting the first and second inductors L1 and L2 and the first capacitor C1 to the integrated circuit 510.

In an example embodiment, the voltage converter 500 may be implemented as a 2-phase boost converter. In this case, one capacitor, for example, a boost capacitor (not shown) may be further connected between the first pad P1 and the ground node. When a voltage is input from the third voltage node VN3, the voltage converter 500 may boost the input voltage and may output the boosted voltage at the first voltage node VN1.

For example, the second inductor L2 and the boost capacitor may form a boost converter of a first phase together with the fifth and sixth switches SW5 and SW6 toggling, and the first inductor L1 and the boost capacitor may form a boost converter of a second phase together with the first and second switches SW1 and SW2 toggling.

Figure 20:
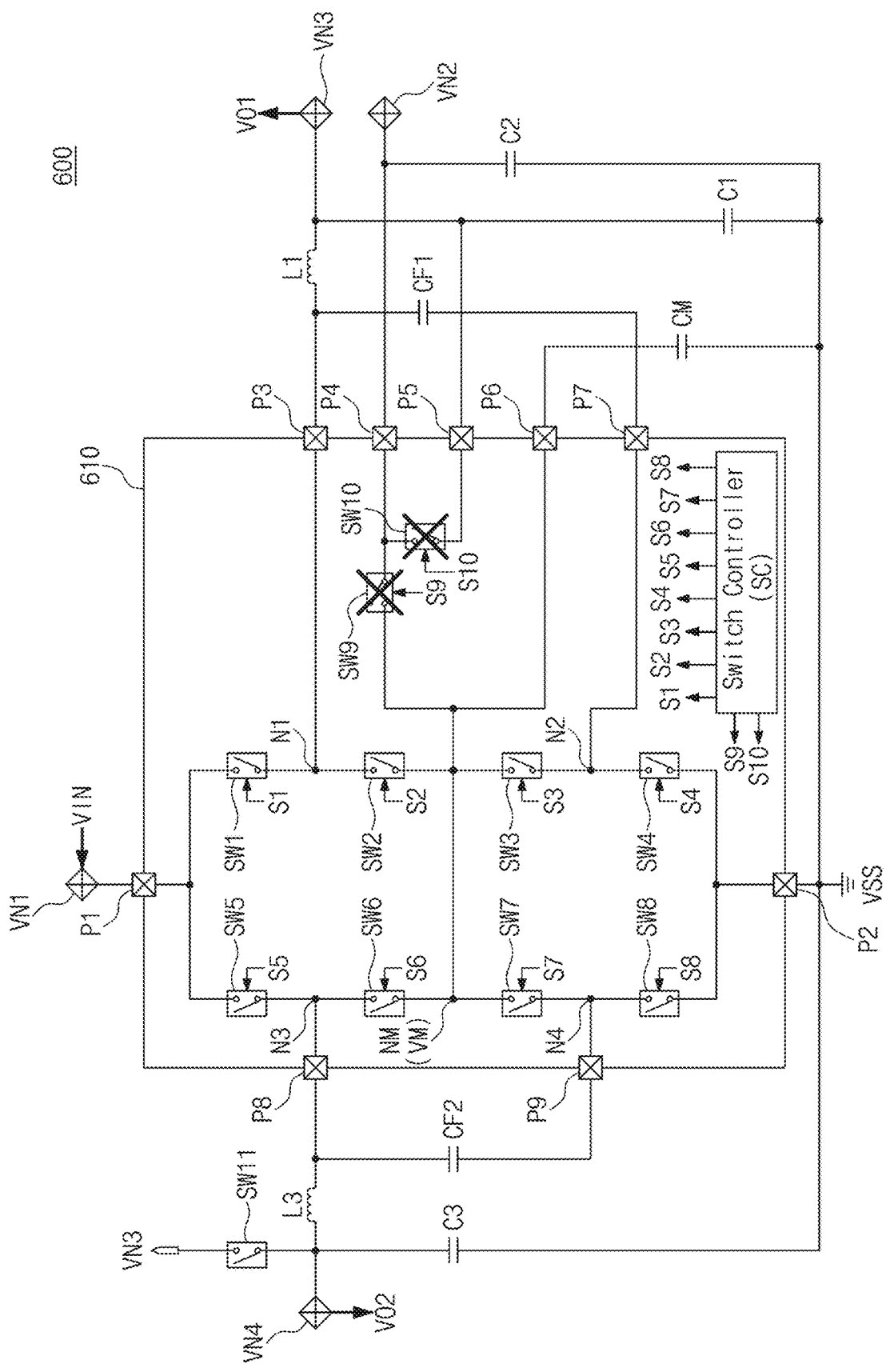
FIG. 20 illustrates a voltage converter according to a sixth example embodiment.

FIG. 20 illustrates a voltage converter 600 according to a sixth example embodiment. An integrated circuit 610 of the voltage converter 600 may be the same as or substantially similar to the integrated circuit 110 of the voltage converter 100 of FIG. 2. Compared with the voltage converter 400 of FIG. 18, the voltage converter 600 may further include a third inductor L3 connected to the eighth pad P8, an eleventh switch SW11 connected between the third inductor L3 and the third voltage node VN3, a fourth voltage node VN4 connected to the third inductor L3, and a third capacitor C3 connected between the fourth voltage node VN4 and the ground node.

As described with reference to FIG. 19, the switch controller SC may control the ninth and tenth signals S9 and S10 such that the ninth and tenth switches SW9 and SW10 are always turned off. Accordingly, in FIG. 20, the ninth and tenth switches SW9 and SW10 are depicted together with "X".

The eleventh switch SW11 may be controlled by the switch controller SC. The eleventh switch SW11 may be included within the integrated circuit 610 and may be connected with external elements through pads. When the eleventh switch SW11 is turned on, the voltage converter 600 may operate as a 2-phase buck converter (or a 2-phase boost converter) (refer to FIG. 19).

When the eleventh switch SW11 is turned off, the first and second switches SW1 and SW2 may operate as one buck converter together with the first inductor L1 and the first capacitor C1, and the fifth and sixth switches SW5 and SW6 may operate as another buck converter together with the third inductor L3 and the third capacitor C3. That is, the voltage converter 600 may operate as two buck converters.

The buck converter including the fifth and sixth switches SW5 and SW6 may output the second output voltage VO2 through the fourth voltage node VN4. In an example embodiment, in the case where the eleventh switch SW11 is removed from the voltage converter 300, the voltage converter 600 may not operate as a 2-phase buck converter, and may operate only as two buck converters. As described with reference to FIG. 19, some components that do not contribute to a voltage converting operation may be removed.

Figure 21:
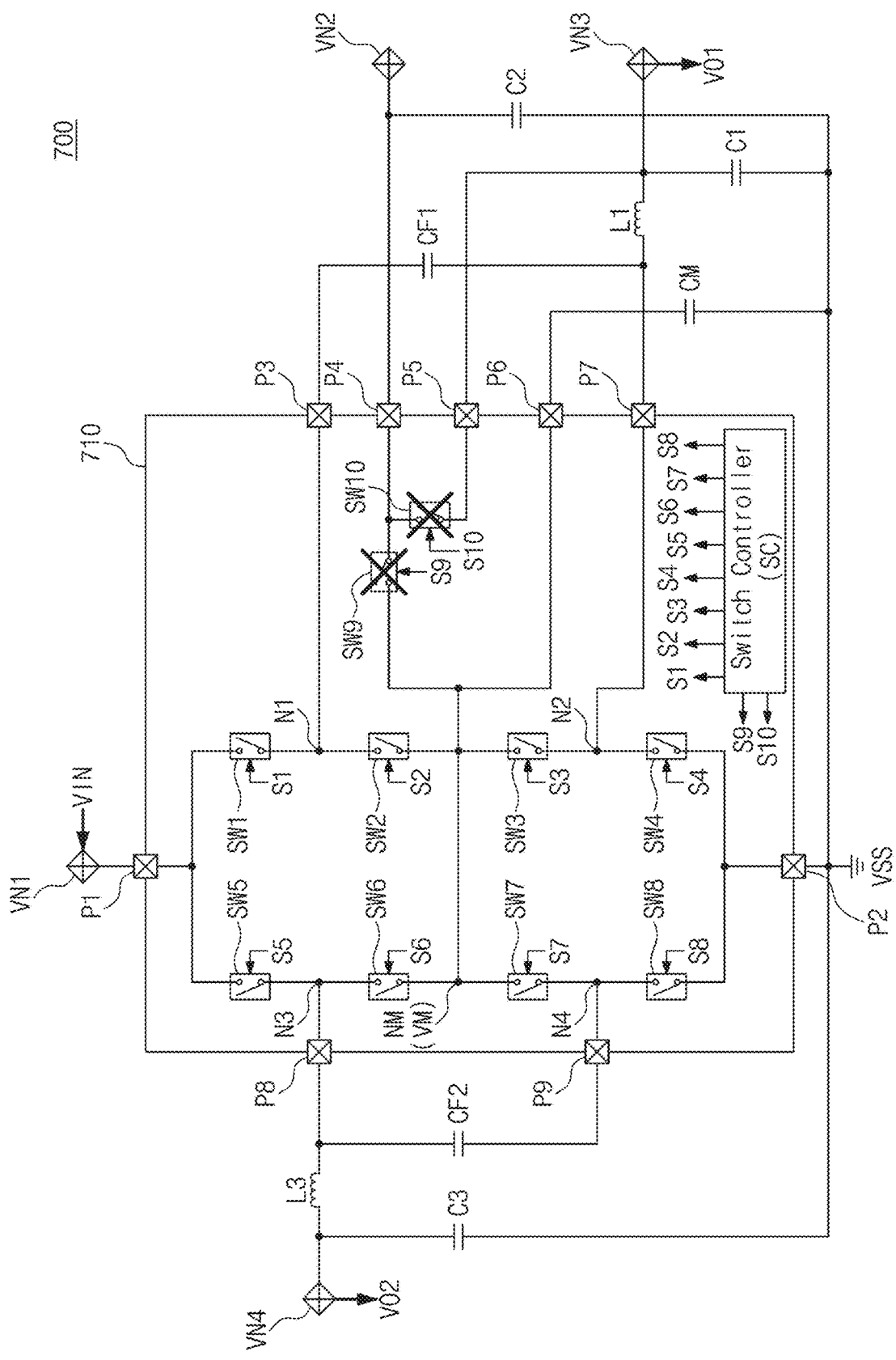
FIG. 21 illustrates a voltage converter according to a seventh example embodiment.

FIG. 21 illustrates a voltage converter 700 according to a seventh example embodiment. An integrated circuit 710 of the voltage converter 700 may be the same as or substantially similar to the integrated circuit 110 of the voltage converter 100 of FIG. 2. Compared with the voltage converter 100 of FIG. 2, the voltage converter 700 may further include a third inductor L3 connected to the eighth pad P8, a fourth voltage node VN4 connected to the third inductor L3, and a third capacitor C3 connected between the fourth voltage node VN4 and the ground node.

As described with reference to FIG. 19, the switch controller SC may control the ninth and tenth signals S9 and S10 such that the ninth and tenth switches SW9 and SW10 are always turned off. Accordingly, in FIG. 21, the ninth and tenth switches SW9 and SW10 are depicted together with "X".

The first inductor L1 and the first capacitor C1 may operate as one buck converter together with the third and fourth switches SW3 and SW4 toggling complementarily or the first and fourth switches SW1 and SW4 (refer to FIGS. 6 and 7) toggling complementarily. The one buck converter may output the first output voltage VO1 at the third voltage node VN3. The first output voltage VO1 may be adjusted within a range between the ground voltage and half the input voltage VIN.

The third inductor L3 and the third capacitor C3 may operate as one buck converter together with the fifth and sixth switches SW5 and SW6 toggling complementarily or the fifth and eighth switches SW5 and SW8 (refer to FIGS. 6 and 7) toggling complementarily. Another buck converter may output the second output voltage VO2 at the fourth voltage node VN4. The second output voltage VO2 may be adjusted within a range between half the input voltage VIN and the input voltage VIN.

Figure 22:
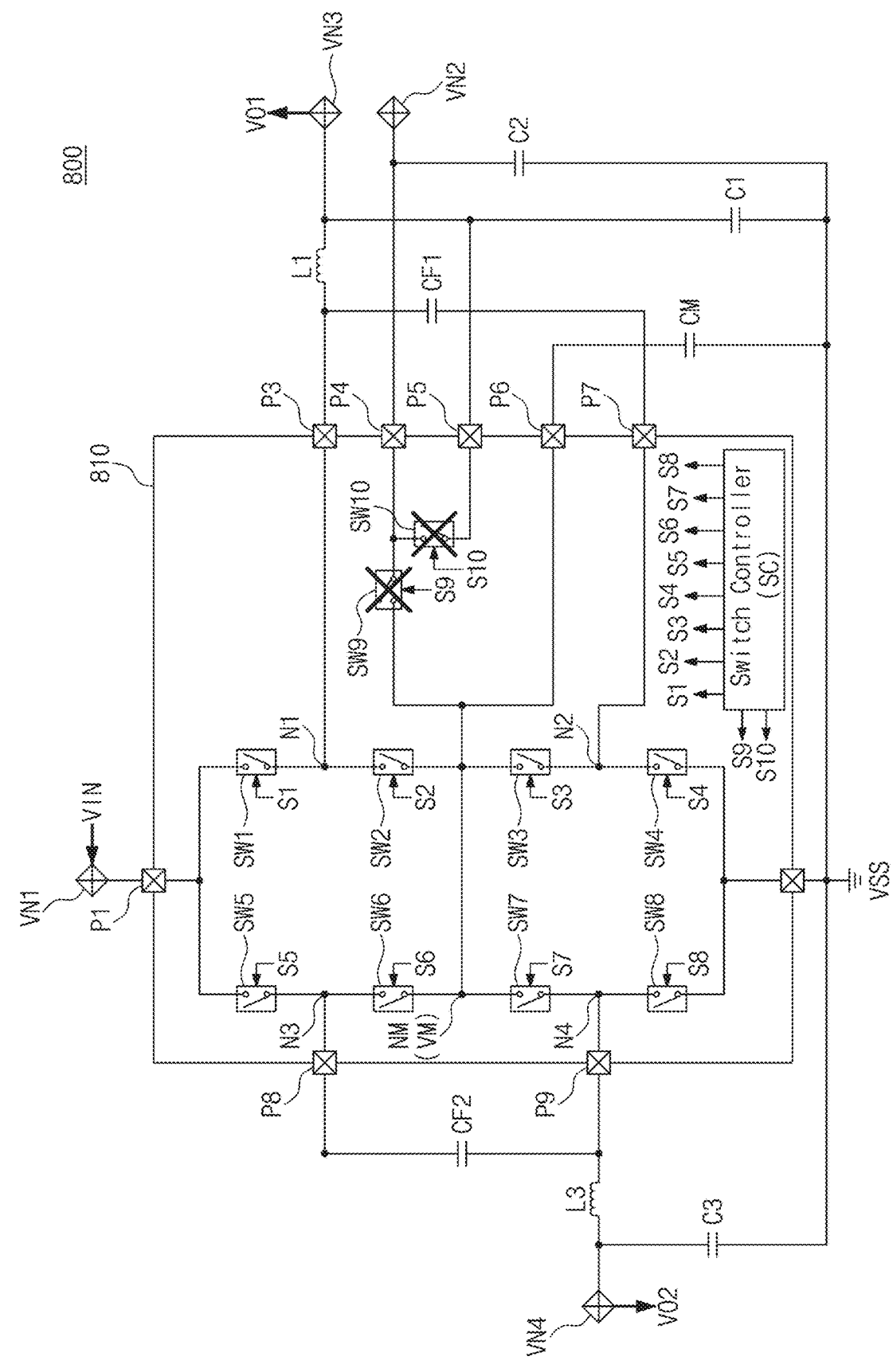
FIG. 22 illustrates a voltage converter according to an eighth example embodiment.

FIG. 22 illustrates a voltage converter 800 according to an eighth example embodiment. An integrated circuit 810 of the voltage converter 800 may be the same as or substantially similar to the integrated circuit 110 of the voltage converter 100 of FIG. 2. Compared with the voltage converter 400 of FIG. 18, the voltage converter 800 may further include a third inductor L3 connected to the ninth pad P9, a fourth voltage node VN4 connected to the third inductor L3, and a third capacitor C3 connected between the fourth voltage node VN4 and the ground node.

As described with reference to FIG. 19, the switch controller SC may control the ninth and tenth signals S9 and S10 such that the ninth and tenth switches SW9 and SW10 are always turned off. Accordingly, in FIG. 21, the ninth and tenth switches SW9 and SW10 are depicted together with "X".

The first inductor L1 and the first capacitor C1 may operate as one buck converter together with the first and second switches SW1 and SW2 toggling complementarily or the first and fourth switches SW1 and SW4 (refer to FIGS. 6 and 7) toggling complementarily. The one buck converter may output the first output voltage VO1 at the third voltage node VN3. The first output voltage VO1 may be adjusted within a range between half the input voltage VIN and the input voltage VIN.

The third inductor L3 and the third capacitor C3 may operate as one buck converter together with the seventh and eighth switches SW7 and SW8 toggling complementarily or the fifth and eighth switches SW5 and SW8 (refer to FIGS. 6 and 7) toggling complementarily. Another buck converter may output the second output voltage VO2 at the fourth voltage node VN4. The second output voltage VO2 may be adjusted within a range between the ground voltage and half the input voltage VIN.

As described above, an integrated circuit according to an embodiment of the inventive concepts may be connected with various components and thus may be implemented as various voltage converters. Accordingly, the flexibility of a voltage converter may be improved, and it may be possible to replace a plurality of voltage converters.

Figure 23:
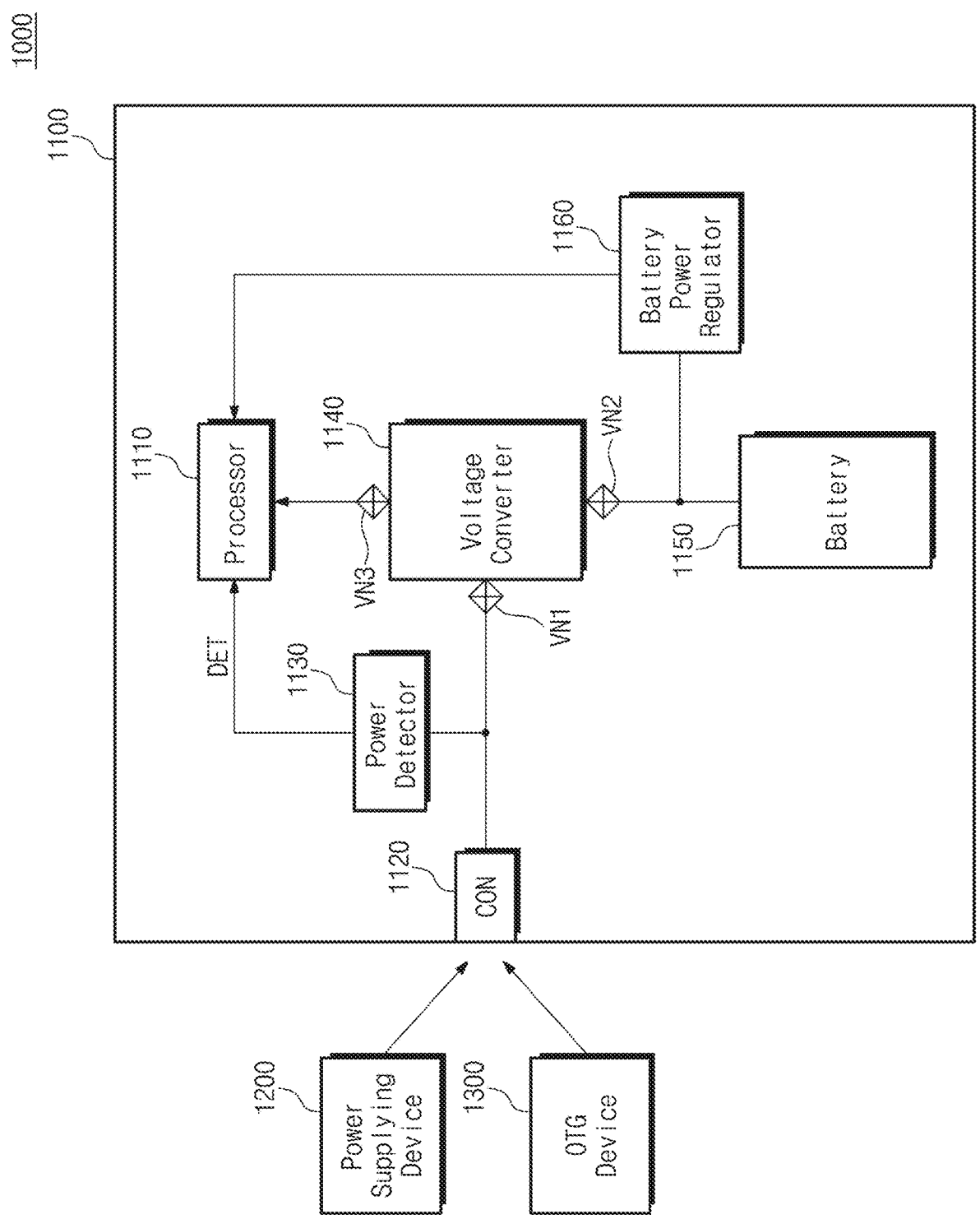
FIG. 23 illustrates a computing system according to an example embodiment of the inventive concepts.

FIG. 23 illustrates a computing system 1000 according to an example embodiment of the inventive concepts. Referring to FIG. 23, the computing system 1000 may include a mobile device 1100, a power supplying device 1200, and an on-the-go (OTG) device 1300.

The mobile device 1100 may include a processor 1110, a connector (CON) 1120, a detector 130, a voltage converter 1140, a battery 1150, and a battery power regulator 1160.

The processor 1110 may control the components of the mobile device 1100 and may execute various codes, operating systems, firmware, and applications for the purpose of driving the mobile device 1100. The processor 1110 may include an application processor (AP).

The connector (CON) 1120 may be connected with an external device. For example, the connector 1120 may include a structure and a protocol complying with the standard of a universal serial bus (USB).

The detector 1130 may detect whether a power is supplied from the external device through the connector 1120. When it is determined that a power is supplied from the external device, the detector 1130 may transfer a detection signal DET to the processor 1110. Also, the detector 1130 may detect whether the OTG device 1300 is connected to the connector 1120. When it is determined that the OTG device 1300 is connected to the connector 1120, the detector 1130 may transfer the detection signal DET to the processor 1110. The detection signal DET may be transferred together with information about the connected device.

The voltage converter 1140 may include the voltage converter 100 of FIG. 2 or the voltage converter 400 of FIG. 18. The voltage converter 1140 may include the first voltage node VN1 connected to the connector 1120, the second voltage node VN2 connected to the battery 1150, and the third voltage node VN3 connected to the processor 1110.

The battery 1150 may be charged based on a power supplied from the outside and may supply a power to the battery power regulator 1160. The battery power regulator 1160 may regulate a level of a voltage transferred from the battery 1150 and may supply the voltage of the regulated level to the processor 1110.

The power supplying device 1200 may supply a power to the mobile device 1100 when coupled to the connector 1120. In response to the supply of the power, the detector 1130 may transfer, to the processor 1110, the detection signal DET indicating that the power supplying device 1200 is connected. In response to the detection signal DET, the processor 1110 may allow the voltage converter 1140 to perform the first type operation of the first mode.

The voltage converter 1140 may output a voltage corresponding to half the voltage supplied through the first voltage node VN1 to the second voltage node VN2. The battery 1150 may be charged by the voltage output to the second voltage node VN2. Further, the voltage converter 1140 may perform buck conversion on the voltage of the second voltage node VN2 (or a voltage input through the first voltage node VN1) and may output the stepped-down voltage to the third voltage node VN3. The processor 1110 may operate by using the voltage of the third voltage node VN3.

In an example embodiment, depending on levels of voltages desired in the mobile device 1100, the processor 1110 may allow the voltage converter 1140 to perform the first type operation, the second type operation, or the third type operation of the first mode.

When the power supplying device 1200 is separated from the mobile device 1100, the detector 1130 may deactivate the detection signal DET. In response to the deactivation of the detection signal DET, the processor 1110 may deactivate the voltage converter 1140. The battery power regulator 1160 may supply voltages to the processor 1110 by using a power charged at the battery 1150. The processor 1110 may operate by using voltages supplied from the battery power regulator 1160.

When the OTG device 1300 is connected to the connector 1120, the detector 1130 may transfer, to the processor 1110, the detection signal DET indicating that the OTG device 1300 is connected. In response to the detection signal DET, the processor 1110 may allow the voltage converter 1140 to operate in the second mode.

The voltage converter 1140 may receive a voltage of the battery 1150 at the second voltage node VN2. The voltage converter 1140 may perform boost conversion on the voltage of the battery 1150, and may output the converted voltage to the first voltage node VN1. The connector 1120 may supply a voltage output from the first voltage node VN1 to the OTG device 1300. For example, depending on a level of a voltage desired in the OTG device 1300, the processor 1110 may allow the voltage converter 1140 to perform the first type operation or the second type operation of the second mode.

As described above, in an environment where various voltage conversions are used in turn, the voltage converter 1140 may be variously configured to perform various voltage conversions. Accordingly, manufacturing costs and the size of the mobile device 1100 may decrease.

In the above-described example embodiments, voltage converters are described by using the terms "first", "second", "third", and the like. However, the terms "first", "second", "third", and the like may be used to distinguish components from each other and do not limit the inventive concepts. For example, the terms "first", "second", "third", and the like do not involve an order or a numerical meaning of any form.

In the above example embodiments, components according to embodiments of the inventive concepts are described by using blocks. The blocks may be implemented with various hardware devices, such as an integrated circuit, an application specific IC (ASCI), a field programmable gate array (FPGA), and a complex programmable logic device (CPLD), firmware driven in hardware devices, or a combination of a hardware device and software. Further, the blocks may include circuits implemented with semiconductor elements in an integrated circuit or circuits enrolled as circuits or intellectual property (IP).

According to some example embodiments of the inventive concepts, a voltage converter may be configured to perform various buck conversions and boost conversions depending on a level of power to be internally provided based on power supplied from the outside or a level of power desired to be supplied to the outside. Accordingly, voltage converters according to some example embodiment of the inventive concepts may replace a plurality of buck converters and a plurality of boost converters, and thus manufacturing costs and the size of a mobile device may decrease.

While the inventive concepts has been described with reference to some example embodiments thereof, it will be apparent to those of ordinary skill in the art that various changes and modifications may be made thereto without departing from the spirit and scope of the inventive concepts as set forth in the following claims.

What is claimed is:

1. A voltage converter comprising:
a switched capacitor block connected between a first voltage node and a ground node, the switched capacitor block including a plurality of first switches and a plurality of capacitors;
a path control block connected to a second voltage node, a third voltage node, and the switched capacitor block, the path control block including a plurality of second switches; and
a passive element block connected to the second voltage node, the third voltage node, and the switched capacitor block, the passive element block including one or more capacitors and one or more inductors,
wherein the voltage converter is configured to,
in a first type operation, receive a first voltage at the first voltage node, convert the first voltage, and transfer the converted first voltage to at least one of the second voltage node or the third voltage node,
in a second type operation, receive a second voltage at the first voltage node and transfer the second voltage to the second voltage node, and
in a third type operation, receive a third voltage at the second voltage node, convert the third voltage, and transfer the converted third voltage to the first voltage node,
wherein the plurality of second switches include a second switch connected between the second voltage node and a center node of the switched capacitor block, and
the second switch is directly connected to the center node of the switched capacitor block.

2. The voltage converter of claim 1, wherein
in the first type operation, the converting the first voltage includes a buck conversion, and
in the third type operation, the converting the third voltage includes a boost conversion.

3. A voltage converter comprising:
a switched capacitor block connected between a first voltage node and a ground node, the switched capacitor block including a plurality of switches and a plurality of capacitors;
a path control block connected to a second voltage node, a third voltage node, and the switched capacitor block, the path control block including a plurality of control switches; and
a passive element block connected to the second voltage node, the third voltage node, and the switched capacitor block, the passive element block including one or more capacitors and one or more inductors,
wherein the passive elements block includes a center capacitor connected between a center node of the switched capacitor and a ground node,
the plurality of control switches include a first control switch connected between the second voltage node and the center node of the switched capacitor block, and
the first control switch is directly connected to the center node of the switched capacitor block.

4. The voltage converter of claim 3, wherein the passive elements block further includes:
a first capacitor connected between the third voltage node and the ground node; and a second capacitor connected between the second voltage node and the ground node.

5. The voltage converter of claim 3, wherein the plurality of control switches include:
a second control switch connected between the second voltage node and the third voltage node.

6. The voltage converter of claim 3, wherein the voltage converter is configured to selectively perform:
a first type operation of receiving a first voltage at the first voltage node, converting the first voltage, and transferring the converted first voltage to at least one of the second voltage node or the third voltage node;
a second type operation of receiving a second voltage at the first voltage node and transferring the second voltage to the second voltage node; and
a third type operation of receiving a third voltage at the second voltage node, converting the third voltage, and transferring the converted third voltage to the first voltage node.

7. The voltage converter of claim 6, wherein
in the first type operation, the converting the first voltage includes a buck conversion, and
in the third type operation, the converting the third voltage includes a boost conversion.

8. The voltage converter of claim 3, wherein the switched capacitor block includes:
first to fourth switches sequentially connected between the first voltage node and the ground node;
fifth to eighth switches sequentially connected between the first voltage node and the ground node, the fifth to eighth switches being parallel with the first to fourth switches;
a first floating capacitor connected between a first node between the first and second switches and a second node between the third and fourth switches; and
a second floating capacitor connected between a third node between the fifth and sixth switches and a fourth node between the seventh and eighth switches.

9. The voltage converter of claim 8, wherein the center node is a node to which a node between the second and third switches and a node between the sixth and seventh switches are connected in common.

10. The voltage converter of claim 8, wherein the passive elements block further includes:
an inductor connected between the second node and the third voltage node.

11. The voltage converter of claim 8, wherein the passive elements block further includes:
an inductor connected between the first node and the third voltage node.

12. The voltage converter of claim 8, wherein
a first voltage is received at the first voltage node,
a second voltage having half a level of the first voltage is output at the second voltage node, and
a level of a third voltage output at the third voltage node is changed by a duty ratio at which the first and third switches toggle.

13. The voltage converter of claim 8, wherein
a first voltage is received at the first voltage node,
a level of a second voltage output at the second voltage node is identical to a third voltage, and
a third voltage output at the third voltage node is changed by a duty ratio at which the first switch toggles.

14. The voltage converter of claim 8, wherein a first voltage is received at the first voltage node, and the first voltage is output at the second voltage node.

15. The voltage converter of claim 8, wherein
a first voltage is received at the second voltage node, and
a level of a second voltage output at the first voltage node is equal to or greater than two times a level of the first voltage.

16. The voltage converter of claim 8, wherein the passive element block further includes:
an inductor connected between the fourth node and the third voltage node.

17. The voltage converter of claim 8, wherein the passive element block further includes:
an inductor connected between a fourth voltage node and the fourth node;
a capacitor connected between the fourth voltage node and the ground node; and
a switch connected between the fourth voltage node and the third voltage node.

18. A voltage converter comprising:
a switched capacitor block connected between a first voltage node and a ground node, the switched capacitor block including a plurality of switches and a plurality of capacitors;
a path control block connected to a second voltage node, a third voltage node, and the switched capacitor block, the path control block including a plurality of control switches; and
a passive element block connected to the second voltage node, the third voltage node, and the switched capacitor block, the passive element block including one or more capacitors and one or more inductors,
wherein the path control block includes,
a first control switch connected between the second voltage node and a center node of the switched capacitor block,
the first control switch is directly connected to the center node of the switched capacitor block, and
a second control switch connected between the second voltage node and the third voltage node.

19. The voltage converter of claim 18, wherein the switched capacitor block includes:
first to fourth switches sequentially connected between the first voltage node and the ground node;
fifth to eighth switches sequentially connected between the first voltage node and the ground node, the fifth to eighth switches being parallel with the first to fourth switches;
a first floating capacitor connected between a first node between the first and second switches and a second node between the third and fourth switches; and
a second floating capacitor connected between a third node between the fifth and sixth switches and a fourth node between the seventh and eighth switches,
wherein the center node is a node to which a node between the second and third switches and a node between the sixth and seventh switches are connected in common.

* * * * *